US008494052B2

(12) United States Patent
Chang et al.

(10) Patent No.: US 8,494,052 B2
(45) Date of Patent: Jul. 23, 2013

(54) DYNAMIC SELECTION OF MOTION ESTIMATION SEARCH RANGES AND EXTENDED MOTION VECTOR RANGES

(75) Inventors: Cheng Chang, Redmond, WA (US); Chih-Lung Lin, Redmond, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1281 days.

(21) Appl. No.: 11/400,051

(22) Filed: Apr. 7, 2006

(65) Prior Publication Data

US 2007/0237232 A1 Oct. 11, 2007

(51) Int. Cl.
*H04N 11/02* (2006.01)

(52) U.S. Cl.
USPC .................. 375/240.16; 375/240.26

(58) Field of Classification Search
USPC .................. 375/240.16, 240.26
See application file for complete search history.

(56) References Cited

U.S. PATENT DOCUMENTS

| 5,168,356 | A | 12/1992 | Acampora et al. |
| 5,243,420 | A | 9/1993 | Hibi |
| 5,295,201 | A | 3/1994 | Yokohama |
| 5,379,351 | A | 1/1995 | Fandrianto et al. |
| 5,386,234 | A | 1/1995 | Veltman et al. |
| 5,428,403 | A | 6/1995 | Andrew et al. |
| 5,477,272 | A | 12/1995 | Zhang et al. |
| 5,495,292 | A | 2/1996 | Zhang et al. |
| 5,497,191 | A | 3/1996 | Yoo et al. |
| 5,533,140 | A | 7/1996 | Sirat et al. |
| 5,594,504 | A | 1/1997 | Ebrahimi et al. |
| 5,650,829 | A | 7/1997 | Sugimoto et al. |
| 5,835,146 | A | 11/1998 | Stone |
| 5,872,604 | A * | 2/1999 | Ogura ........................... 348/699 |
| 5,883,674 | A * | 3/1999 | Ogura ...................... 375/240.15 |
| 5,912,991 | A | 6/1999 | Jeon et al. |
| 5,963,259 | A | 10/1999 | Nakaya et al. |
| 6,014,181 | A | 1/2000 | Sun |

(Continued)

FOREIGN PATENT DOCUMENTS

| EP | 0 535 746 | 4/1993 |
| EP | 0 634 873 | 1/1995 |

(Continued)

OTHER PUBLICATIONS

U.S. Appl. No. 60/341,674, filed Dec. 17, 2001, Lee et al.

(Continued)

*Primary Examiner* — Shuwang Liu
*Assistant Examiner* — Michael Neff
(74) *Attorney, Agent, or Firm* — Klarquist Sparkman, LLP

(57) ABSTRACT

Techniques and tools for selecting search ranges and/or motion vector ranges during motion estimation are described. For example, a video encoder performs motion estimation constrained by a first search range, which results in multiple motion vectors. The encoder computes motion vector distribution information for the motion vectors. To compute the distribution information, the encoder can track the motion vectors in a histogram and count how many of the motion vectors fall within each of multiple intervals for the distribution information. The encoder then selects a second search range and performs motion estimation constrained by the second search range. Selecting the second search range can include selecting a motion vector range, which in some cases in effect determines the second search range.

18 Claims, 10 Drawing Sheets

U.S. PATENT DOCUMENTS

| | | | |
|---|---|---|---|
| 6,020,925 | A | 2/2000 | Jung |
| 6,078,618 | A | 6/2000 | Yokoyama et al. |
| 6,081,209 | A | 6/2000 | Schuyler et al. |
| 6,081,622 | A | 6/2000 | Carr et al. |
| 6,104,753 | A | 8/2000 | Kim et al. |
| 6,175,592 | B1 | 1/2001 | Kim et al. |
| 6,188,777 | B1 | 2/2001 | Darrell et al. |
| 6,195,389 | B1 | 2/2001 | Rodriguez et al. |
| 6,208,692 | B1 | 3/2001 | Song et al. |
| 6,249,318 | B1 | 6/2001 | Girod et al. |
| 6,285,712 | B1 | 9/2001 | Kondo et al. |
| 6,317,460 | B1 | 11/2001 | Lee |
| 6,418,166 | B1 | 7/2002 | Wu et al. |
| 6,421,383 | B2 | 7/2002 | Beattie |
| 6,483,874 | B1 | 11/2002 | Panusopone et al. |
| 6,493,658 | B1 | 12/2002 | Koford et al. |
| 6,501,798 | B1 | 12/2002 | Sivan |
| 6,594,313 | B1 | 7/2003 | Hazra et al. |
| 6,650,705 | B1 | 11/2003 | Vetro et al. |
| 6,697,427 | B1 | 2/2004 | Kurak, Jr. et al. |
| 6,728,317 | B1 | 4/2004 | Demos |
| 6,867,714 | B2 | 3/2005 | Song et al. |
| 6,876,703 | B2 | 4/2005 | Ismaeil et al. |
| 6,879,632 | B1 | 4/2005 | Yokoyama |
| 6,968,008 | B1 | 11/2005 | Ribas-Corbera et al. |
| 6,983,018 | B1 * | 1/2006 | Lin et al. .................. 375/240.16 |
| 6,987,866 | B2 | 1/2006 | Hu |
| 7,239,721 | B1 | 7/2007 | Kumar et al. |
| 7,457,361 | B2 | 11/2008 | Zhu et al. |
| 7,551,673 | B1 * | 6/2009 | Oh et al. .................. 375/240.16 |
| 2002/0114394 | A1 | 8/2002 | Ma |
| 2002/0154693 | A1 | 10/2002 | Demos et al. |
| 2003/0067988 | A1 | 4/2003 | Kim et al. |
| 2003/0156643 | A1 | 8/2003 | Song |
| 2003/0156646 | A1 | 8/2003 | Hsu et al. |
| 2004/0081361 | A1 | 4/2004 | Chen et al. |
| 2004/0114688 | A1 | 6/2004 | Kang |
| 2005/0013372 | A1 * | 1/2005 | Srinivasan ............... 375/240.16 |
| 2005/0013500 | A1 | 1/2005 | Lee et al. |
| 2005/0094731 | A1 | 5/2005 | Xu et al. |
| 2005/0135484 | A1 | 6/2005 | Lee et al. |
| 2005/0147167 | A1 | 7/2005 | Dumitras et al. |
| 2005/0169546 | A1 | 8/2005 | Shin et al. |
| 2005/0226335 | A1 | 10/2005 | Lee et al. |
| 2005/0276330 | A1 | 12/2005 | Park et al. |
| 2006/0002471 | A1 | 1/2006 | Lippincott et al. |
| 2006/0120455 | A1 | 6/2006 | Park et al. |
| 2006/0133505 | A1 | 6/2006 | Watanabe et al. |
| 2006/0233258 | A1 | 10/2006 | Holcomb |
| 2007/0092010 | A1 | 4/2007 | Huang et al. |
| 2007/0171978 | A1 | 7/2007 | Chono |
| 2007/0237226 | A1 | 10/2007 | Regunathan et al. |
| 2007/0268964 | A1 | 11/2007 | Zhao |
| 2008/0008242 | A1 | 1/2008 | Lu et al. |

FOREIGN PATENT DOCUMENTS

| | | |
|---|---|---|
| EP | 0 825 778 | 2/1998 |
| JP | 63-209286 | 8/1988 |
| JP | 63-267080 | 11/1988 |
| JP | 05-219499 | 8/1993 |
| JP | 06-233279 | 8/1994 |
| JP | 10-136375 | 5/1998 |
| JP | 11-203483 | 7/1999 |
| JP | 2003-219428 | 7/2003 |
| JP | 2005-354478 | 12/2005 |
| WO | WO 00/70879 | 11/2000 |

OTHER PUBLICATIONS

Benzler et al., "Improving Multiresolution Motion Compensating Hybrid Coding by Drift Reduction," *Picture Coding Symposium*, 4 pp. (1996).

Borman et al., "Block-Matching Sub-Pixel Motion Estimation from Noisy, Under-Sampled Frames—An Empirical Performance Evaluation," *SPIE Visual Communications and Image Processing*, 10 pp. (1999).

Chen et al., "A Fast Block Matching Algorithm Based on the Winner-Update Strategy," *Proc. Fourth Asian Conference on Computer Vision*, vol. 2, pp. 977-982, Taipei, Taiwan (2000).

Conklin et al., "Multi-resolution Motion Estimation," *Proc. ICASSP'97*, Munich, Germany, 4 pp. (1997).

Diehl, "Object-Oriented Motion Estimation and Segmentation in Image Sequences," *Signal Processing: Image Communication*, pp. 23-56 (1991).

Ericsson, "Fixed and Adaptive Predictors for Hybrid Predictive/Transform Coding," *IEEE Transactions on Communications*, vol. COM-33, No. 12, pp. 1291-1302 (1985).

Fang et al., "Block Matching Video Chip," in MIT MTL Annual Report, 1998; pp. 7-8 (1998).

Gibson et al., *Digital Compression for Multimedia: Principles and Standards*, Chapter 11, pp. 363-417, Morgan Kaufmann Publishers (1998).

Girod, "Motion Compensation: Visual Aspects, Accuracy, and Fundamental Limits," *Motion Analysis and Image Sequence Processing*, Kluwer Academic Publishers, pp. 125-152 (1993).

Goh et al., "Model-Based Multiresolution Motion Estimation from Noisy Images," *CVGIP: Image Understanding*, vol. 59, No. 3, pp. 307-319 (1994).

Horn et al., "Estimation of Motion Vector Fields for Multiscale Motion Compensation," *Proceedings Picture Coding Symposium* (*PCS 97*), pp. 141-144 (Sep. 1997).

Hsieh et al., "A Novel Fast Estimation Algorithm Using Fixed Subsampling Pattern and Multiple Local Winners Search," *Proc. 2001 IEEE Int'l Symposium on Circuits and Systems (ISCAS 2001)*, vol. 2, pp. 241-244 (2001).

IBM, Technical Disclosure Bulletin, "Advanced Motion Estimation for Moving Picture Expert Group Encodes," vol. 39, No. 43, pp. 323-324 (1996).

ISO/IEC, "Coding of Audio-Visual Objects: Visual, ISO/IEC 14496-2," 14496-2, 330 pp. (1998).

ISO/IEC, "Coding of Moving Pictures and Associated Audio for Digital Storage Media at Up to About 1.5 Mbit/s, Part 2: Video," 11172-2, 112 pp. (1993).

ISO, ISO/IEC JTC1/SC29/WG11 MPEG 97/N1642, "MPEG-4 Video Verification Model Version 7.0 3. Encoder Definition," pp. 1, 17-122, Bristol (Apr. 1997).

ISO/IEC, "MPEG-4 Video Verification Model Version 10.0," JTC1/SC29/WG11, MPEG98/N1992, 305 pp. (1998).

ITU-T Recommendation H.261, "Line of Transmission of Non-Telephone Signals," International Telecommunications Union, pp. i, 1-25 (Mar. 1993).

ITU-T Recommendation H.262, "Transmission of Non-Telephone Signals," International Telecommunications Union, 204 pp. (Jul. 1995).

ITU-T Recommendation H.263, "Series H: Audiovisual and Multimedia Systems, Infrastructure of Audiovisual Services—Coding of Moving Video," International Telecommunications Union, 155 pp. (Feb. 1998).

Iwahashi et al., "A Motion Compensation Technique for Downscaled Pictures in Layered Coding," *IEICE Transactions on Comm.*, vol. E77-B , No. 8, pp. 1007-1012 (Aug. 1994).

Kim et al., "A Fast Three-Step Search Algorithm with Minimum Checking Points Using Unimodal Error Surface Assumption," *IEEE Transactions on Consumer Electronics*, vol. 44, No. 3, pp. 638-648 (1998).

Morimoto et al., "Fast Electronic Digital Image Stabilization," *Proc. ICPR*, Vienna, Austria, 5 pp. (1996).

"MPEG Video Compression Technique," 9 pp. [Downloaded from the World Wide Web on Mar. 14, 2005].

Reader, "History of MPEG Video Compression—Ver. 4.0," 99 pp. [Document marked Dec. 16, 2003].

Schaar-Mitrea et al., "Hybrid Compression of Video with Graphics in DTV Communication Systems," *IEEE Trans. on Consumer Electronics*, pp. 1007-1017 (2000).

Seferidis, "General Approach to Block-Matching Motion Estimation," *Optical Engineering*, vol. 32, No. 7, pp. 1464-1474 (1993).

Solari, *Digital Video and Audio Compression*, Chapter 4, pp. 77-108, The McGraw-Hill Companies (1997).

Sullivan et al., "The H.264/AVC Advanced Video Coding Standard: Overview and Introduction to the Fidelity Range Extensions," 21 pp. (Aug. 2004).

Tourapis et al., "Fast Motion Estimation Using Modified Circular Zonal Search," *Proc. SPIE, VCIP '99*, San Jose, CA, 4 pp. (1999).

Tzanetakis et al., "Motion Estimation Based in Affine Moment Invariants," *Proc. European Signal Processing Conference 1998 (EUSIPCO '98)*, Rhodes, Greece, 4 pp. (1998).

Wiegand, "Joint Model No. 1, Revision 1 (JM1-r1)," JVT-A003r1, 80 pp. (Document marked "Generated: Jan. 18, 2002").

Wien, "Variable Block-Size Transforms for Hybrid Video Coding," Dissertation, 182 pp. (Feb. 2004).

Wu et al., "A gradient-based method for general motion estimation and segmentation," *J. Visual Communication and Image Representation*, vol. 4, No. 1, pp. 25-38 (1993).

Yue et al., "A Fast Effective Block Motion Estimation Algorithm," *Proc. 4th Int'l Conf. on Signal Processing (ICSP '98)*, Beijing, pp. 827-830 (1998).

Bjontegaard, "H.26L Test Model Long Term No. 5 (TML-5) draft0," q15k59d1.doc, 35 pp. (document marked Oct. 2000).

Kossentini et al., "Predictive RD Optimized Motion Estimation for Very Low Bit-rate Video Coding," *IEEE J. on Selected Areas in Communications*, vol. 15, No. 9 pp. 1752-1763 (Dec. 1997).

Wedi, "Complexity Reduced Motion Compensated Prediction with ⅛-pel Displacement Vector Resolution," *ITU—VCEG-L20, Study Group 16, Video Coding Experts Group (Question 6)*, 8 pp. (document marked Dec. 2000).

Wiegand et al., "Long-term Memory Motion Compensated Prediction," *IEEE Transactions on Circuits & Systems for Video Technology*, vol. 9, No. 1, pp. 70-84 (Feb. 1999).

Chen et al., "Fast Motion Estimation for JVT," JVT-G016, 12 pp. (downloaded from the World Wide Web on Mar. 18, 2006).

Choi et al., "The Fast Mode Decision with Fast Motion Estimation," JVT-N013, 8 pp. (downloaded from the World Wide Web on Jan. 27, 2006).

"Digital Video Processing (EE392J)," Department of Electrical Engineering, Stanford University, Problem Set No. 2, 4 pp. (document marked Jan. 21, 2004).

"DivX Multi Standard Video Encoder," 2 pp. (downloaded from the World Wide Web on Jan. 24, 2006).

Hallapuro et al., "Performance Analysis of Low Bit Rate H.26L Video Encoder," *Proc. IEEE International Conference on Acoustics, Speech, and Signal Processing*, vol. 2, pp. 1129-1132 (May 2001).

Hong et al., Further Improvement of Motion Search Range, JVT-C065, 5 pp. (downloaded from the World Wide Web on Mar. 18, 2006).

Hong et al., "Further Improvement of Motion Search Range," JVT-D117, 5 pp. (downloaded from the World Wide Web on Mar. 18, 2006).

Hong et al., "Range Decision for Motion Estimation of VCEG-N33," JVT-B022, 4 pp. (downloaded from the World Wide Web on Mar. 18, 2006).

Horn et al., "Cost-Effective Vision Systems for Intelligent Highway Applications," 37 pp.

Kim et al., "Low-Complexity Macroblock Mode-Selection for H.264/AVC Encoders," *Image Processing*, vol. 2, pp. 765-768 (Oct. 2004).

Tourapis et al., "Fast ME in the JM Reference Software," JVT-P026, 26 pp. (downloaded from the World Wide Web on Mar. 18, 2006).

Xu et al., "Comments on Motion Estimation Algorithms in Current JM Software," JVT-Q089, 12 pp. (downloaded from the World Wide Web on Mar. 18, 2006).

Xu et al., "Modification of Dynamic Search Range for JVT," JVT-Q088, 7 pp. (downloaded from the World Wide Web on Mar. 18, 2006).

Yi et al., "Improved and Simplified Fast Motion Estimation for JM," JVT-P021, 23 pp. (downloaded from the World Wide Web on Mar. 18, 2006).

International Search Report dated Sep. 21, 2007, from International Patent Application No. PCT/US2007/008943, 2 pp.

Tourapis et al., "Predictive Motion Vector Field Adaptive Search Technique (PMVFAST)—Enhancing Block Based Motion Estimation," Proc. Visual Communications and Image Processing, 10 pp. (2001).

First Office Action dated Feb. 12, 2010, from Chinese Patent Application No. 200780012309.0, 6 pp.

European Search Report (Extended) for European Application No. 07 755 273.5 dated Aug. 31, 2011, 8 pages.

European Supplementary Search Report for European Application No. 07 755 273.5 dated Sep. 19, 2011, 1 page.

Notice of Rejection dated Jun. 29, 2012, Japanese Patent Application No. 2009-504357, 4 pages.

Office Action dated Aug. 17, 2012, European Patent Application No. 07 755 273.5, 4 pages.

Final Notice of Rejection dated Mar. 22, 2013, Japanese Patent Application No. 2009-504357, 7 pages (partial translation).

Notice of Preliminary Rejection, dated May 31, 2013, Korean Patent Application No. 10-2008-7024084, 4 pages (partial translation).

\* cited by examiner

Figure 1, prior art
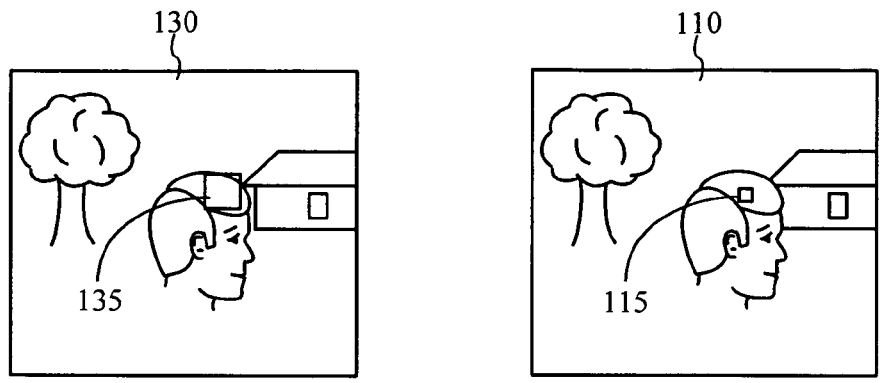
Figure 2
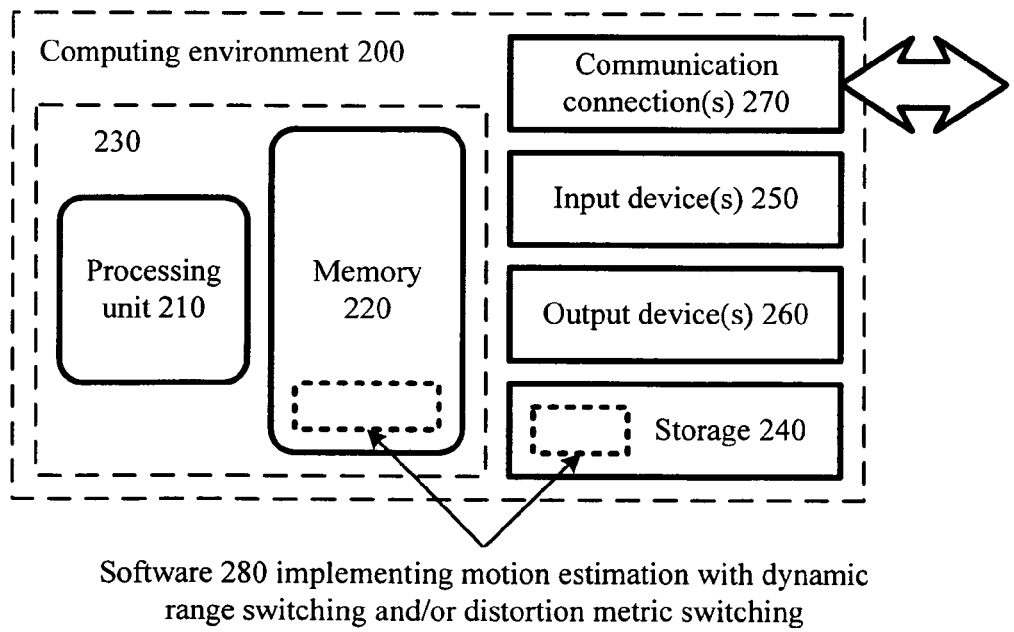
Software 280 implementing motion estimation with dynamic range switching and/or distortion metric switching

Figure 4
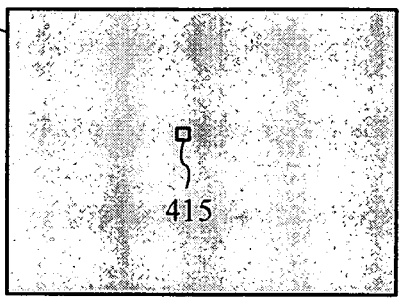
Full search around co-located block in reference picture
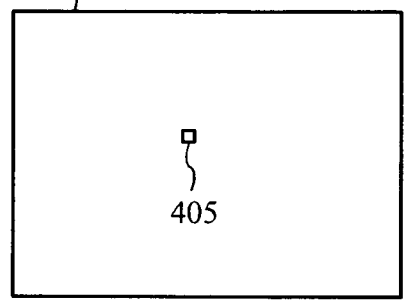
Current block of current predicted picture
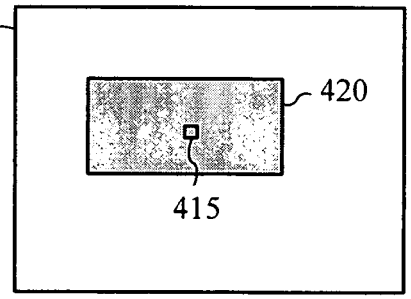
Search around co-located block in reference picture, constrained by motion vector range
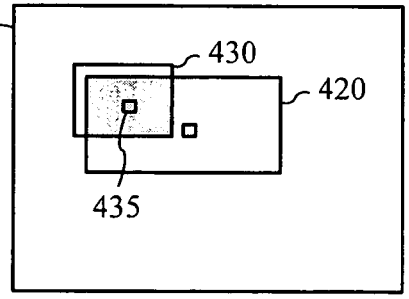
Search around block at location of predicted motion vector in reference picture, further constrained by motion vector range

Figure 6

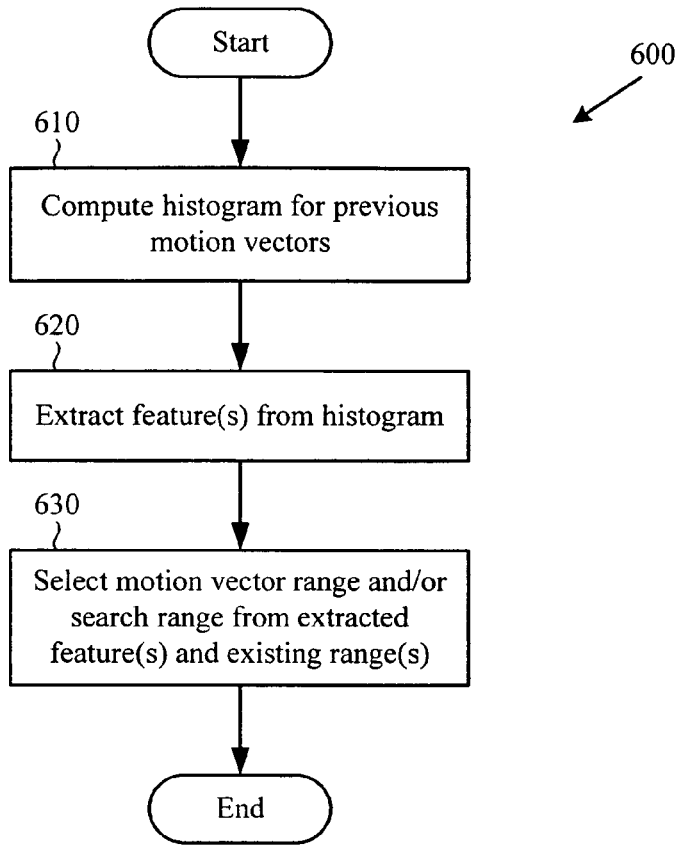

- 610: Compute histogram for previous motion vectors
- 620: Extract feature(s) from histogram
- 630: Select motion vector range and/or search range from extracted feature(s) and existing range(s)

Figure 7

```
CalculateMVHistogram( IN MV_x, IN MV_y, OUT MVHistogram[5120] )
     for ( s = 0; s < 5120; s++ ) {
            MVHistogram [s] = 0;
     }
     for ( n = 0; n < number of blocks; n++ ) {
            if ( n^th block is an Intra block ) {
                   MVHistogram [0] ++;
            }
            else {
                   absMV_x = abs ( MV_x[n] );
                   absMV_y = abs ( MV_y[n] );
                   MVHistogram [ absMV_x + absMV_y ] ++;
            }
     }
End_CalculateMVHistogram
```

Figure 9

```
ExtractHistogramFeature( IN MVHistogram, IN i, OUT Low, OUT Medium, OUT Overflow, OUT High )
    Low = Medium = Overflow = High = 0;
    If ( i > 0 ) {
        for ( s = 2; s < max_MVSum[i-1] * 2 / 3; s++ ) {
            Low += MVHistogram[s];
        }
        for ( s = max_MVSum[i-1] * 2 / 3; s < max_MVSum[i-1]; s++ ) {
            Medium += MVHistogram[s];
        }
        for ( s = max_MVSum[i-1]; s < max_MVSum[i] * 2 / 3; s++ ) {
            Overflow += MVHistogram[s];
        }
        for ( s = max_MVSum[i] * 2 / 3; s < max_MVSum[i]; s++ ) {
            High += MVHistogram[s];
        }
        Overflow += High;
    }
    else if ( i = 0 ) {
        for ( s = 2; s < max_MVSum[i] * 2 / 3; s++ ) {
            Overflow += MVHistogram[s];
        }
        for ( s = max_MVSum[i] * 2 / 3; s < max_MVSum[i]; s++ ) {
            High += MVHistogram[s];
        }
        Overflow += High;
    }
End_ExtractHistogramFeature
```

```
DecideRange( IN CurrMVRangeIndex, IN Low, IN Medium, IN Overflow, IN High, OUT NewMVRangeIndex )
    NonZeroMotion = Low + Medium + Overflow;
    NewMVRangeIndex = CurrMVRangeIndex;
    if ( NonZeroMotion > α * number of blocks && High > β * NonZeroMotion ) {
        NewMVRangeIndex = NewMVRangeIndex + 1;
    }
    if ( Overflow < γ * NonZeroMotion && Medium < β * NonZeroMotion ) {
        NewMVRangeIndex = NewMVRangeIndex – 1;
    }
    if ( NewMVRangeIndex > 3 ) {
        NewMVRangeIndex = 3;
    }
    if (NewMVRangeIndex < 0) {
        NewMVRangeIndex = 0;
    }
End_DecideRange
```

DYNAMIC SELECTION OF MOTION ESTIMATION SEARCH RANGES AND EXTENDED MOTION VECTOR RANGES

BACKGROUND

Digital video consumes large amounts of storage and transmission capacity. A typical raw digital video sequence includes 15 or 30 frames per second. Each frame can include tens or hundreds of thousands of pixels (also called pels), where each pixel represents a tiny element of the picture. In raw form, a computer commonly represents a pixel as a set of three samples totaling 24 bits. Thus, the number of bits per second, or bit rate, of a raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which the quality of the video does not suffer, but decreases in bit rate are limited by the inherent amount of variability (sometimes called entropy) of the video data. Or, compression can be lossy, in which the quality of the video suffers, but achievable decreases in bit rate are more dramatic. Lossy compression is often used in conjunction with lossless compression—the lossy compression establishes an approximation of information, and the lossless compression is applied to represent the approximation.

A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

In general, video compression techniques include "intra-picture" compression and "inter-picture" compression. Intra-picture compression techniques compress individual pictures, and inter-picture compression techniques compress pictures with reference to a preceding and/or following picture (often called a reference or anchor picture) or pictures.

Inter-picture compression techniques often use motion estimation and motion compensation to reduce bit rate by exploiting temporal redundancy in a video sequence. Motion estimation is a process for estimating motion between pictures. In one common technique, an encoder using motion estimation attempts to match a current block of samples in a current picture with a candidate block of the same size in a search area in another picture, the reference picture. When the encoder finds an exact or "close enough" match in the search area in the reference picture, the encoder parameterizes the change in position between the current and candidate blocks as motion data (such as a motion vector ("MV")). A motion vector is conventionally a two-dimensional value, having a horizontal component that indicates left or right spatial displacement and a vertical component that indicates up or down spatial displacement. In general, motion compensation is a process of reconstructing pictures from reference picture(s) using motion data.

FIG. 1 illustrates motion estimation for part of a predicted picture in an example encoder. For an 8×8 block of samples, 16×16 block (often called a "macroblock"), or other unit of the current picture, the encoder finds a similar unit in a reference picture for use as a predictor. In FIG. 1, the encoder computes a motion vector for a 16×16 macroblock (115) in the current, predicted picture (110). The encoder searches in a search area (135) of a reference picture (130). Within the search area (135), the encoder compares the macroblock (115) from the predicted picture (110) to various candidate macroblocks in order to find a candidate macroblock that is a good match. The encoder outputs information specifying the motion vector to the predictor macroblock.

The encoder computes the sample-by-sample difference between the current unit and its motion-compensated prediction to determine a residual (also called error signal). The residual is frequency transformed, quantized, and entropy encoded. As a linear energy-compacting transform, the frequency transform tends to produce transform coefficients with energy concentrated in lower frequency coefficients. The overall bit rate of a predicted picture depends in large part on the bit rate of residuals. The bit rate of residuals is low if the residuals are simple (i.e., due to motion estimation that finds exact or good matches) or lossy compression drastically reduces the complexity of the residuals. Bits saved with successful motion estimation can be used to improve quality elsewhere or reduce overall bit rate. On the other hand, the bit rate of complex residuals can be higher, depending on the degree of lossy compression applied to reduce the complexity of the residuals.

If a predicted picture is used as a reference picture for subsequent motion compensation, the encoder reconstructs the predicted picture. When reconstructing residuals, the encoder reconstructs transform coefficients that were quantized using inverse quantization and performs an inverse frequency transform. The encoder performs motion compensation to compute the motion-compensated predictors, and combines the predictors with the reconstructed residuals.

Encoders typically spend a large proportion of encoding time performing motion estimation, attempting to find good matches and thereby improve rate-distortion performance. Generally, using a large search range in a reference picture improves the chances of an encoder finding a good match. The encoder potentially compares a current block against all possible spatially displaced blocks in the large search range, however. In most scenarios, an encoder lacks the time or resources to check every possible motion vector in a large search range for every block or macroblock to be encoded. In particular, when a codec allows motion vectors for large displacements, the computational cost of searching through a large search range for the best motion vector can be prohibitive, especially when the content to be encoded is high definition video. Various techniques help encoders speed up motion estimation.

With one type of technique, a user setting, profile setting, or level setting directly sets motion vector range to be a particular size. Motion vector range indicates the allowed sizes of motion vectors. For an encoder that otherwise performs a full search across a reference picture, the motion vector range in effect constrains the search range by excluding motion vectors outside the motion vector range. A user sets the motion vector range with a command-line parameter, user interface control, etc., to over-ride a default value. For example, for high-quality, off-line encoding, a large motion vector range (and hence large search range) is used. Or, for lower-quality, real-time encoding, a smaller motion vector range (and hence smaller search range) is used. While these settings address concerns about encoding time and resources, they are inflexible in that they do not adapt motion vector range or search range to changes in motion characteristics of the video content being encoded. As a result, in some scenarios, a large motion vector range and search range are unneeded for a series of low-motion pictures. Or, a small motion vector range and search range are inadequate for a series of high-motion pictures.

In hierarchical motion estimation, an encoder finds one or more motion vectors at a low resolution (e.g., using 4:1 downsampled pictures), scales up the motion vector(s) to a higher resolution (e.g., integer-pixel), finds one or more motion vectors at the higher resolution in neighborhood(s) around the scaled up motion vector(s), and so on. While this allows the encoder to skip exhaustive searches at the higher resolutions, it can result in wasteful long searches at the low resolution when there is little or no motion to justify such searches. Such hierarchical motion estimation also fails to adapt motion vector range and search range to changes in motion characteristics in the video content being encoded.

Other encoders dynamically adjust search range when performing motion estimation for a current block or macroblock of a picture by considering the motion vectors of immediately spatially adjacent blocks in the same picture. Such encoders dramatically speed up motion estimation by tightly focusing the motion vector search process for the current block or macroblock. However, in certain scenarios (e.g., strong localized motion, discontinuous motion or other complex motion), such motion estimation can fail to provide adequate performance.

In general, encoders use a distortion metric during motion estimation. A distortion metric helps an encoder evaluate the quality and rate costs associated with using a candidate block in a motion estimation choice.

One common distortion metric is sum of absolute differences ("SAD"). To compute the SAD for a candidate block in a reference picture, the encoder computes the sum of the absolute values of the residual between the current and candidate blocks, where the residual is the sample-by-sample difference between the current block and the candidate block. Low computational complexity is an advantage of SAD. SAD is a poor approximation of overall rate-distortion cost in some cases, however. In particular, when there are large but uniform sample differences between the current block and the candidate block, SAD poorly approximates actual distortion. SAD fails to account for the energy-compacting effects of the frequency transforms performed on residuals. Suppose a current block has significant but uniform differences in sample values compared to a candidate block. Most likely, a frequency transform during encoding will capture and isolate the uniform sample differences in a non-zero DC coefficient value. (The DC coefficient is the lowest frequency transform coefficient.) Because of the energy compaction effects, the overall rate-distortion cost of choosing the candidate block is likely small. SAD may incorrectly indicate a large cost, however.

Some video encoders therefore use sum of absolute Hadamard-transformed differences ("SAHD") as a distortion metric or use another sum of absolute transformed differences ("SATD") metric. To compute the SAHD for a candidate block in a reference picture, an encoder Hadamard transforms the current block and Hadamard transforms the candidate block, then computes the sum of the absolute values of the differences between the Hadamard-transformed blocks. Or, the encoder computes a residual, Hadamard transforms the residual, and computes the sum of absolute values of the Hadamard-transformed residual. The frequency transform used later in compression is often not a Hadamard transform. Rather, the Hadamard transform approximates the energy compaction of the frequency transform that the encoder later uses on residuals, but the Hadamard transform is simpler to compute. Using SAHD in motion estimation often results in better rate-distortion performance than using SAD, as SAHD accounts for uniform overall sample value shifts, but using SAHD also increases computational complexity. A single Hadamard transform is relatively simple, but performing a Hadamard transform when computing a distortion metric greatly increases the aggregate computational complexity of motion estimation, since encoders typically spend such a large proportion of encoding time evaluating different candidate blocks during motion estimation.

Sum of squared errors ("SSE"), mean squared error ("MSE"), and mean variance are other distortion metrics. With SSE, an encoder squares the values of a residual then sums the squared values. With MSE, an encoder computes the mean of the squared values. One definition of mean variance is:

$$\frac{1}{I} \sum_i (x_i^r - \bar{x}_i^r)^2,$$

where $\bar{x}_i^r$ is the mean of the I residual values in the residual $x_i^r$. Mean variance to some extent accounts for overall differences between a current block and candidate block. SSE, MSE and mean variance yield acceptable rate-distortion performance in some cases, but increase the computational complexity of measuring distortion.

Some encoders compute rate-distortion cost as a distortion metric during motion estimation. A rate-distortion cost has a distortion term and a rate term, with a factor (often called a Lagrangian multiplier) scaling the rate term relative to the distortion term. The rate term can be an estimated or actual bit rate cost for motion vector information and/or residual information. The distortion term can be based upon a comparison (e.g., SAD) of original samples to reconstructed samples (samples reconstructed following a frequency transform, quantization, inverse quantization, and an inverse frequency transform). Or, the distortion term can be some other distortion measure or estimate. Rate-distortion cost usually provides the most accurate assessment of rate-distortion performance of different motion estimation choices, but also has the highest computational complexity, especially if different quantization parameters are evaluated for each different motion estimation choice.

In most cases, an encoder uses the same distortion metric (e.g., only SAD, only SAHD) throughout motion estimation. This is inflexible and, depending on the metric used, can be computationally inefficient or result in poor rate-distortion performance.

Another approach is to use SAD to find the top x candidate motion vectors in motion estimation, then use rate-distortion cost to evaluate each of the top x candidate motion vectors. For example, the top 3 candidates are evaluated with rate-distortion cost. While this avoids the computational cost of using rate-distortion cost from the start of motion estimation, in some cases the encoder misses good candidates due to deficiencies of SAD, and settles instead on inferior candidates. If an encoder uses SAHD at the start, followed by rate-distortion cost on the top x candidates, the encoder is more likely to find good candidates, but computational complexity is dramatically increased.

In still another approach, an encoder uses SAD at an integer-pixel stage of hierarchical motion estimation and uses SAHD at ½-pixel and ¼-pixel stages of the hierarchical motion estimation. Again, while this avoids the computational cost of using SAHD from the start of motion estimation, in many cases the encoder misses good candidates due to deficiencies of SAD.

Aside from these techniques, many encoders use specialized motion vector search patterns or other strategies deemed likely to find a good match in an acceptable amount of time. Various other techniques for speeding up or otherwise improving motion estimation have been developed. Given the critical importance of video compression to digital video, it is not surprising that motion estimation is a richly developed field. Whatever the benefits of previous motion estimation techniques, however, they do not have the advantages of the following techniques and tools.

SUMMARY

The present application is directed to techniques and tools for selecting search ranges and/or motion vector ranges during motion estimation. For example, a video encoder selects a motion vector range for a current picture using motion vector distribution information for the motion vectors of a previous picture. In many cases, the motion vector range in effect constrains the search range of motion estimation for the current picture. In this way, the video encoder improves the performance of motion estimation for video sequences with varying levels of motion.

According to a first aspect of the described techniques and tools, a video encoder performs motion estimation constrained by a first search range, which results in multiple motion vectors. The encoder computes motion vector distribution information for the motion vectors. For example, the encoder tracks the motion vectors in a histogram and counts how many fall within each of multiple intervals for the distribution information. The encoder then selects a second search range and performs motion estimation constrained by the second search range.

According to a second aspect of the described techniques and tools, a video encoder performs motion estimation constrained by a first motion vector range and a first search range. The encoder signals the first motion vector range and results of the motion estimation in a video bit stream. After selecting a second motion vector range, the encoder performs motion estimation constrained by the second motion vector range and a second search range. The encoder signals the second motion vector range and results of the second motion estimation in the video bit stream.

According to a third aspect of the described techniques and tools, an encoder includes a motion estimator for performing motion estimation, a frequency transformer, a quantizer, an entropy encoder, and a motion estimation controller for selecting search ranges that constrain the motion estimation. For a current picture, the selecting is based at least in part upon motion vector distribution information for multiple previous motion vectors.

This summary introduces a selection of concepts in a simplified form. The concepts are further described below in the detailed description. This summary is not intended to identify key features or essential features of the claimed subject matter, nor is it intended to be used to limit the scope of the claimed subject matter.

The foregoing and other objects, features, and advantages will become more apparent from the following detailed description, which proceeds with reference to the accompanying figures.

BRIEF DESCRIPTION OF THE DRAWINGS

FIG. 1 is a diagram showing motion estimation according to the prior art.

FIG. 2 is a block diagram of a suitable computing environment in which several described embodiments may be implemented.

FIG. 4 is a diagram showing relationships between motion vector range and search range in motion estimation.

FIG. 6 is a flowchart of a technique for selecting a motion vector range and/or search range using one or more features of a histogram.

FIG. 7 is a pseudocode listing for an example histogram calculation routine.

FIG. 9 is a pseudocode listing for an example histogram feature extraction routine.

FIG. 11 is a pseudocode listing for an example range selection routine.

DETAILED DESCRIPTION

Figure 3:
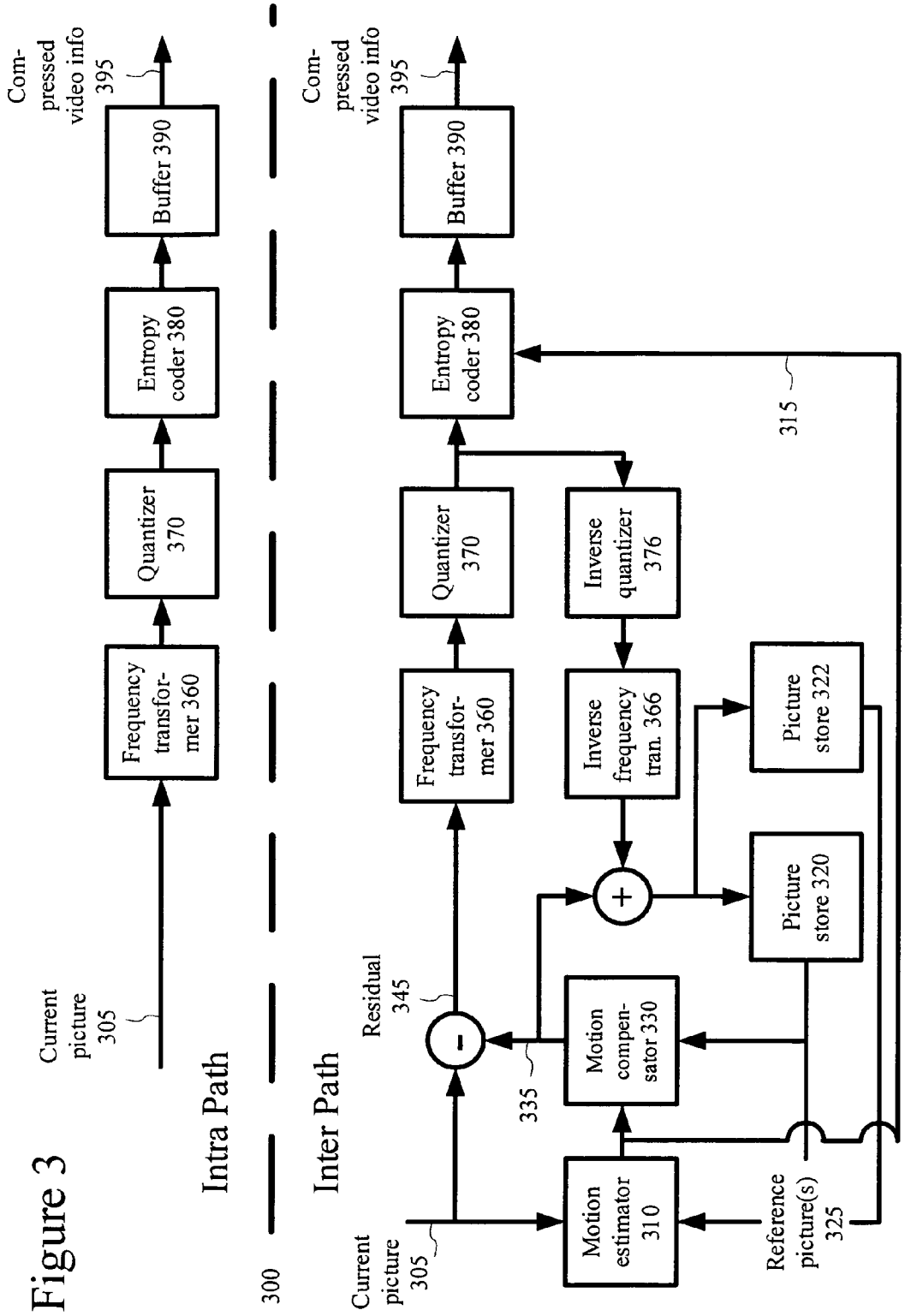
FIG. 3 is a block diagram of a video encoder system in conjunction with which several described embodiments may be implemented.

The present application relates to techniques and tools for performing motion estimation. In various described embodiments, a video encoder performs the motion estimation.

Various alternatives to the implementations described herein are possible. For example, certain techniques described with reference to flowchart diagrams can be altered by changing the ordering of stages shown in the flowcharts, by repeating or omitting certain stages, etc.

The various techniques and tools described herein can be used in combination or independently. Different embodiments implement one or more of the described techniques and tools. Various techniques and tools described herein can be used for motion estimation in a tool other than video encoder, for example, a image synthesis or interpolation tool.

Some of the techniques and tools described herein address one or more of the problems noted in the Background. Typically, a given technique/tool does not solve all such problems. Rather, in view of constraints and tradeoffs in encoding time, resources and/or quality, the given technique/tool improves performance for a particular motion estimation implementation or scenario.

1. Computing Environment

FIG. 2 illustrates a generalized example of a suitable computing environment (200) in which several of the described embodiments may be implemented. The computing environment (200) is not intended to suggest any limitation as to scope of use or functionality, as the techniques and tools may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing an encoder with one or more of the described techniques and tools for motion estimation.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, DVDs, or any other medium which can be used to store information and which can be accessed within the computing environment (200). The storage (240) stores instructions for the software (280) implementing the video encoder.

The input device(s) (250) may be a touch input device such as a keyboard, mouse, pen, or trackball, a voice input device, a scanning device, or another device that provides input to the computing environment (200). For audio or video encoding, the input device(s) (250) may be a sound card, video card, TV tuner card, or similar device that accepts audio or video input in analog or digital form, or a CD-ROM or CD-RW that reads audio or video samples into the computing environment (200). The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "decide" and "analyze" to describe computer operations in a computing environment. These terms are high-level abstractions for operations performed by a computer, and should not be confused with acts performed by a human being. The actual computer operations corresponding to these terms vary depending on implementation.

2. Generalized Video Encoder

FIG. 3 is a block diagram of a generalized video encoder (300) in conjunction with which some described embodiments may be implemented. The encoder (300) receives a sequence of video pictures including a current picture (305) and produces compressed video information (395) as output to storage, a buffer, or a communications connection. The format of the output bitstream can be a Windows Media Video or VC-1 format, MPEG-x format (e.g., MPEG-1, MPEG-2, or MPEG-4), H.26x format (e.g., H.261, H.262, H.263, or H.264), or other format.

The encoder (300) processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context. The encoder (300) is block-based and use a 4:2:0 macroblock format for frames, with each macroblock including four 8×8 luminance blocks (at times treated as one 16×16 macroblock) and two 8×8 chrominance blocks. For fields, the same or a different macroblock organization and format may be used. The 8×8 blocks may be further sub-divided at different stages, e.g., at the frequency transform and entropy encoding stages. The encoder (300) can perform operations on sets of samples of different size or configuration than 8×8 blocks and 16×16 macroblocks.

Alternatively, the encoder (300) is object-based or uses a different macroblock or block format.

Returning to FIG. 3, the encoder system (300) compresses predicted pictures and intra-coded, key pictures. For the sake of presentation, FIG. 3 shows a path for key pictures through the encoder system (300) and a path for predicted pictures. Many of the components of the encoder system (300) are used for compressing both key pictures and predicted pictures. The exact operations performed by those components can vary depending on the type of information being compressed.

A predicted picture (e.g., progressive P-frame or B-frame, interlaced P-field or B-field, or interlaced P-frame or B-frame) is represented in terms of prediction from one or more other pictures (which are typically referred to as reference pictures or anchors). A prediction residual is the difference between predicted information and corresponding original information. In contrast, a key picture (e.g., progressive I-frame, interlaced I-field, or interlaced I-frame) is compressed without reference to other pictures.

If the current picture (305) is a predicted picture, a motion estimator (310) estimates motion of macroblocks or other sets of samples of the current picture (305) with respect to one or more reference pictures. The picture store (320) buffers a reconstructed previous picture (325) for use as a reference picture. When multiple reference pictures are used, the multiple reference pictures can be from different temporal directions or the same temporal direction. The encoder system (300) can use the separate stores (320) and (322) for multiple reference pictures.

The motion estimator (310) can estimate motion by full-sample, ½-sample, ¼-sample, or other increments, and can switch the precision of the motion estimation on a picture-by-picture basis or other basis. The motion estimator (310) (and compensator (330)) also can switch between types of reference picture sample interpolation (e.g., between bicubic and bilinear) on a per-picture or other basis. The precision of the motion estimation can be the same or different horizontally and vertically. The motion estimator (310) outputs as side information motion information (315). The encoder (300) encodes the motion information (315) by, for example, computing one or more motion vector predictors for motion vectors, computing differentials between the motion vectors and motion vector predictors, and entropy coding the differentials. To reconstruct a motion vector, a motion compensator (330) combines a motion vector predictor with differential motion vector information.

The motion compensator (330) applies the reconstructed motion vectors to the reconstructed (reference) picture(s) (325) when forming a motion-compensated current picture (335). The difference (if any) between a block of the motion-compensated current picture (335) and corresponding block of the original current picture (305) is the prediction residual (345) for the block. During later reconstruction of the current picture, reconstructed prediction residuals are added to the motion compensated current picture (335) to obtain a reconstructed picture that is closer to the original current picture (305). In lossy compression, however, some information is still lost from the original current picture (305). Alternatively, a motion estimator and motion compensator apply another type of motion estimation/compensation.

A frequency transformer (360) converts spatial domain video information into frequency domain (i.e., spectral, transform) data. For block-based video pictures, the frequency transformer (360) applies a discrete cosine transform ("DCT"), variant of DCT, or other forward block transform to blocks of the samples or prediction residual data, producing blocks of frequency transform coefficients. Alternatively, the frequency transformer (360) applies another conventional frequency transform such as a Fourier transform or uses wavelet or sub-band analysis. The frequency transformer (360) may apply an 8×8, 8×4, 4×8, 4×4 or other size frequency transform.

A quantizer (370) then quantizes the blocks of transform coefficients. The quantizer (370) applies uniform, scalar quantization to the spectral data with a step-size that varies on a picture-by-picture basis or other basis. The quantizer (370) can also apply another type of quantization to spectral data coefficients, for example, a non-uniform, vector, or non-adaptive quantization. In addition to adaptive quantization, the encoder (300) can use frame dropping, adaptive filtering, or other techniques for rate control.

When a reconstructed current picture is needed for subsequent motion estimation/compensation, an inverse quantizer (376) performs inverse quantization on the quantized spectral data coefficients. An inverse frequency transformer (366) performs an inverse frequency transform, producing reconstructed prediction residuals (for a predicted picture) or samples (for a key picture). If the current picture (305) was a key picture, the reconstructed key picture is taken as the reconstructed current picture (not shown). If the current picture (305) was a predicted picture, the reconstructed prediction residuals are added to the motion-compensated predictors (335) to form the reconstructed current picture. One or both of the picture stores (320, 322) buffers the reconstructed current picture for use in subsequent motion-compensated prediction. In some embodiments, the encoder applies a de-blocking filter to the reconstructed picture to adaptively smooth discontinuities and other artifacts in the picture.

The entropy coder (380) compresses the output of the quantizer (370) as well as certain side information (e.g., motion information (315), quantization step size). Typical entropy coding techniques include arithmetic coding, differential coding, Huffman coding, run length coding, LZ coding, dictionary coding, and combinations of the above. The entropy coder (380) typically uses different coding techniques for different kinds of information, and can choose from among multiple code tables within a particular coding technique.

The entropy coder (380) provides compressed video information (395) to the multiplexer ("MUX") (390). The MUX (390) may include a buffer, and a buffer level indicator may be fed back to a controller. Before or after the MUX (390), the compressed video information (395) can be channel coded for transmission over the network. The channel coding can apply error detection and correction data to the compressed video information (395).

A controller (not shown) receives inputs from various modules such as the motion estimator (310), frequency transformer (360), quantizer (370), inverse quantizer (376), entropy coder (380), and buffer (390). The controller evaluates intermediate results during encoding, for example, estimating distortion and performing other rate-distortion analysis. The controller works with modules such as the motion estimator (310), frequency transformer (360), quantizer (370), and entropy coder (380) to set and change coding parameters during encoding. When an encoder evaluates different coding parameter choices during encoding, the encoder may iteratively perform certain stages (e.g., quantization and inverse quantization) to evaluate different parameter settings. The encoder may set parameters at one stage before proceeding to the next stage. Or, the encoder may jointly evaluate different coding parameters, for example, jointly making an intra/inter block decision and selecting motion vector values, if any, for a block. The tree of coding parameter decisions to be evaluated, and the timing of corresponding encoding, depends on implementation.

The relationships shown between modules within the encoder (300) indicate general flows of information in the encoder; other relationships are not shown for the sake of simplicity. In particular, FIG. 3 usually does not show side information indicating the encoder settings, modes, tables, etc. used for a video sequence, picture, macroblock, block, etc. Such side information, once finalized, is sent in the output bitstream, typically after entropy encoding of the side information.

Particular embodiments of video encoders typically use a variation or supplemented version of the generalized encoder (300). Depending on implementation and the type of compression desired, modules of the encoder can be added, omitted, split into multiple modules, combined with other modules, and/or replaced with like modules. For example, the controller can be split into multiple controller modules associated with different modules of the encoder. In alternative embodiments, encoders with different modules and/or other configurations of modules perform one or more of the described techniques.

3. Dynamic Motion Search Range for Coding with Extended Motion Vectors

When encoding predicted pictures, certain video encoders allow the use of "large" motion vectors, meaning motion vectors that specify large displacements horizontally and/or vertically. Large motion vectors help the encoder capture motion that is extreme, complex or discontinuous. The computational cost of searching through a large range of possibilities for a motion vector can be prohibitive, however, especially when high definition video content is to be encoded.

This section describes techniques that enable an encoder to dynamically choose and switch between different motion vector ranges and/or search ranges while encoding video content. For example, the encoder selectively uses a large motion vector range when high motion is likely but not at other times. This can greatly reduce the computational costs associated with motion estimation while producing results comparable to motion estimation in which a large motion vector range is constantly applied for every predicted picture.

The encoder switches between multiple, pre-defined motion vector ranges. For example, the encoder switches between the following ranges.

TABLE 1

Example Motion Vector Ranges

| MV Range | MV Range in Full-pixel Units (horiz × vert) |
| --- | --- |
| 0 | [−64, 63.f] × [−32, 31.f] |
| 1 | [−128, 127.f] × [−64, 63.f] |
| 2 | [−512, 511.f] × [−128, 127.f] |
| 3 | [−1024,1023.f] × [−256, 255.f] |

Alternatively, the encoder switches between other and/or additional motion vector ranges. Or, the encoder dynamically computes and adjusts motion vector ranges to use in motion estimation.

Motion vector range can affect the search range used in motion estimation in several ways. If an encoder by default uses a full search of a reference picture in motion estimation, motion vector range can limit which motion vector values are allowable (and, hence, which motion vector values are potentially evaluated in motion estimation). FIG. 4 shows a current picture (400) and reference picture (410) in motion estimation. For a current block (405) of the current picture (400), if the encoder by default performs a full or unconstrained search of the reference picture (410), the motion vector range (420) effectively limits the search range to motion vector values within the motion vector range (420), which is centered around a reference picture block (415) co-located with the current block (405). Picture boundaries can also limit the search range when the search range would otherwise extend past reference picture boundaries, if edge extension is not used.

Even when an encoder performs a partial search of the reference picture (410), the motion vector range (420) can further limit the search range to those areas of the partial search range that would yield motion vectors within the motion vector range (420). Suppose the encoder searches within a default partial search range (430) that is centered around a predicted motion vector location (435) in the reference picture (410). If areas of the default partial search range (430) lie outside the motion vector range (420), those areas are in effect excluded from the search range used in motion estimation. If the default search range (430) yields only motion vectors within the motion vector range (420), however, the motion vector range (420) in effect does not further constrain the search range used in motion estimation.

In some implementations (such as VC-1 encoder implementations), an encoder signals motion vector range information for motion vectors. For example, the encoder signals motion vector range information at picture layer in a bitstream syntax as described in U.S. Patent Publication No. 2005/0013372, entitled "Extended Range Motion Vectors" by Srinivasan, or U.S. Patent Publication No. 2005/0058205, entitled, "Extended Range Variable Length Coding/Decoding of Differential Motion Vector Information" by Holcomb et al., or using some other mechanism. Signaling motion vector range information improves the efficiency of entropy encoding in some scenarios by adapting the number of bits used to signal escape-coded motion vector information. The signaled motion vector range can be the same as the search range used. Or, the signaled motion vector range can be wider than the search range used. In other implementations, motion vector range is pre-defined or effectively unlimited for entropy encoding purposes (even if search range varies), and the encoder does not signal motion vector range information.

In some implementations, an encoder encoding video for the Windows Media Video main or advanced profile or a VC-1 profile dynamically chooses an appropriate motion vector range and/or search range during encoding. Alternatively, an encoder encoding video for another format or profile performs the dynamic selection of motion vector range and/or search range during encoding.

In some implementations, an encoder uses motion vector distribution information in a histogram or other representation when deciding an appropriate motion vector range and/or search range. The distribution information includes multiple intervals, and some of the intervals overlap. The encoder considers the count of motion vectors within intervals as a criterion when deciding a range. This provides a computationally simple yet accurate way to determine the appropriate range.

A. Dynamically Switching MV Ranges and/or Search Ranges

Figure 5:
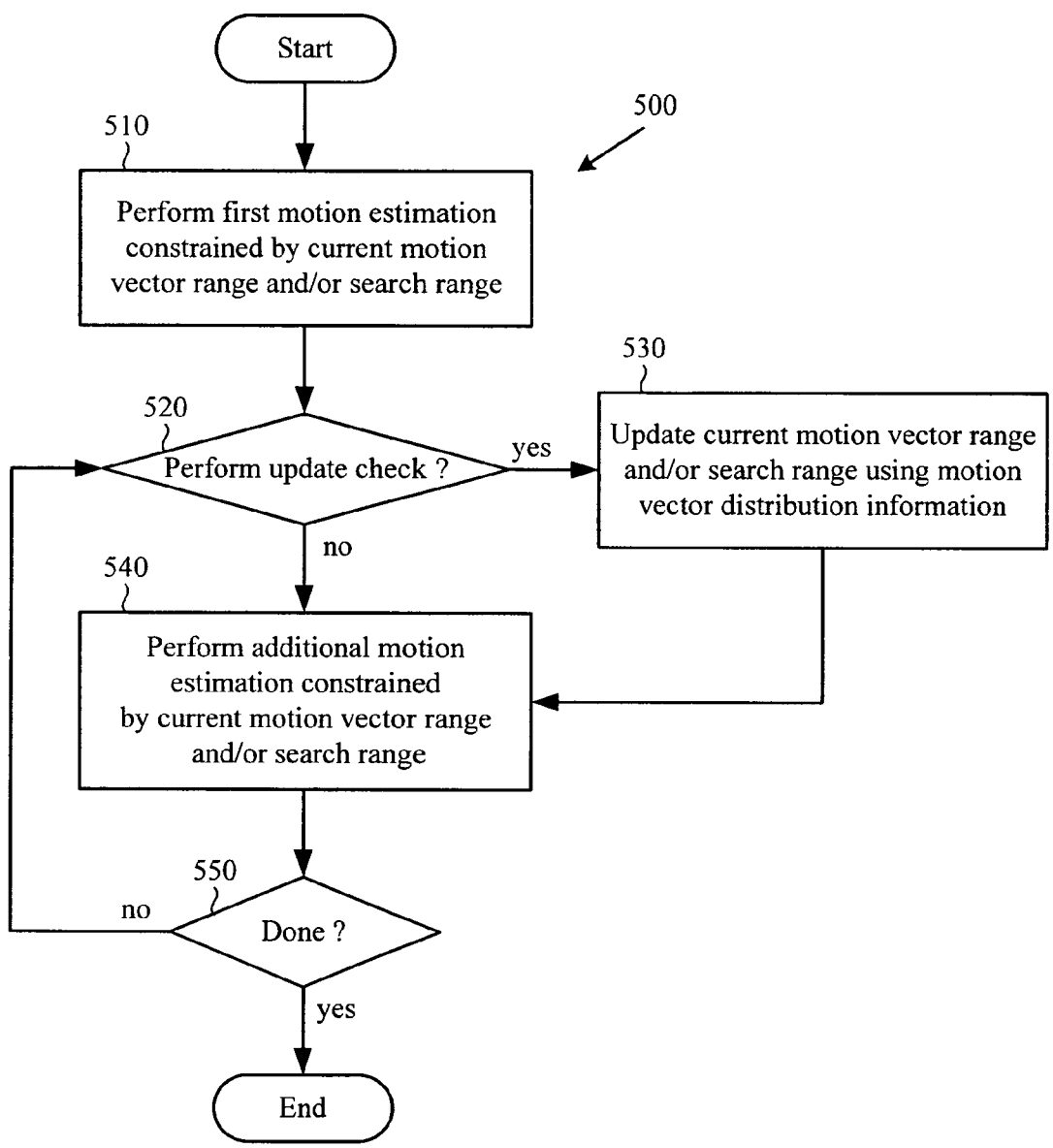
FIG. 5 is a flowchart of a generalized technique for dynamically switching motion vector ranges and/or search ranges based upon motion vector distribution information.

FIG. 5 shows a generalized technique (500) for dynamically switching motion vector ranges and/or search ranges. An encoder such as the one shown in FIG. 3 performs the technique (500). Alternatively, another encoder or motion estimation tool performs the technique (500).

The encoder performs (510) first motion estimation that is constrained by a motion vector range and/or search range. The motion vector range can constrain a full search or partial search, or the search range can be entirely within the motion vector range. For example, the encoder performs motion estimation for a first P-picture using a current motion vector range and search range. Or, the encoder performs motion estimation for a first part of a predicted picture using a current motion vector range and search range. Initially, the current motion vector range can have a value defined according to a particular user setting, profile setting, level setting, or other encoder setting, or can start with a default setting such as the largest motion vector range. The search pattern(s), distortion metric(s), exit condition(s), sub-pixel interpolation and other details of the motion estimation vary depending on implementation.

After performing (510) the first motion estimation, the encoder signals results of the first motion estimation. For example, the encoder signals motion vector information for motion vectors resulting from the first motion estimation. In some implementations, the encoder signals motion vector range information before signaling the motion vector information for the motion vectors.

The encoder then decides (520) whether it should perform an update check for the motion vector range and/or search range. For example, the encoder potentially updates the motion vector range for each new P-picture but not for intervening B-pictures between P-pictures. In this way, the motion vector range adapts to changes in motion characteristics from P-picture to P-picture. Consider a series of intra (I), single predicted (P), and bi-predicted (B) pictures having the following playback order and coded order.

playback: $I_1 \, B_1 \, B_2 \, P_1 \, B_3 \, B_4 \, P_2 \, B_5 \, B_6 \, P_3 \ldots$
coded: $I_1 \, P_1 \, B_1 \, B_2 \, P_2 \, B_3 \, B_4 \, P_3 \, B_5 \, B_6 \ldots$ The motion vector range for $P_2$ depends on the distribution of motion vectors from $P_1$, and the motion vector range for $P_2$ is also used for $B_3$ and $B_4$. The motion vector range for $P_3$ depends on the distribution of motion vectors from $P_2$, and the motion vector range for $P_3$ is also used for $B_5$ and $B_6$, and so on. Alternatively, the encoder performs an update check for each new predicted picture (whether P-picture or B-picture), accounting for changes in prediction direction and scaling for temporal displacement as appropriate. For a B-picture, the encoder can consider motion vector distribution information from the closest P-picture, or from P-pictures both before and after the B-picture, scaling motion vector information depending on the relative temporal displacement of the B-picture from the P-picture(s). Or, the encoder performs update checks for different parts within a single predicted picture.

When the encoder performs an update check, the encoder updates (530) the current motion vector range and/or search range using motion vector distribution information for previous motion vectors. For example, when the encoder selects an updated motion vector range for a new P-picture, the distribution information characterizes multiple motion vectors from the preceding P-picture. Or, when the encoder selects an updated motion vector range for a new part of a predicted picture, the distribution information characterizes multiple motion vectors from earlier in the same picture. Or, the encoder selects a new search range using the motion vector distribution information, without regard to motion vector range per se. The updated search range can be the same or different than the search range used in the previous motion estimation, and the updated motion vector range can be the same or different than the motion vector range used in the previous motion estimation. FIG. 6 shows an example technique (600) for selecting an updated motion vector range and/or search range using a histogram of motion vector information for previous motion vectors. Alternatively, the encoder uses another mechanism to select an updated motion vector range and/or search range, for example, one that uses another form of motion vector distribution information for the previous motion vectors. The updated motion vector range and/or search range is then used as the current motion vector range and/or search range.

The encoder performs (540) additional motion estimation that is constrained by the current (potentially updated) motion vector range and/or search range. For example, the encoder performs motion estimation for a second P-picture using a new motion vector range and corresponding search range. Or, the encoder performs motion estimation for a second part of a predicted picture using an updated search range. Again, the search pattern(s), distortion metric(s), exit condition(s), sub-pixel interpolation and other details of the additional motion estimation vary depending on implementation.

After performing (540) the additional motion estimation, the encoder signals results of the additional motion estimation. For example, the encoder signals motion vector information for motion vectors resulting from the additional motion estimation. In some implementations, the encoder signals motion vector range information before signaling the motion vector information for the motion vectors.

The encoder determines (550) whether or not it is done. If not, the encoder decides (520) whether it should perform an update check for the motion vector range and/or search range. For example, the encoder continues with the next predicted picture or next part of the same predicted picture.

B. Range Selecting Using MV Distribution Information

Figures 8, 10:
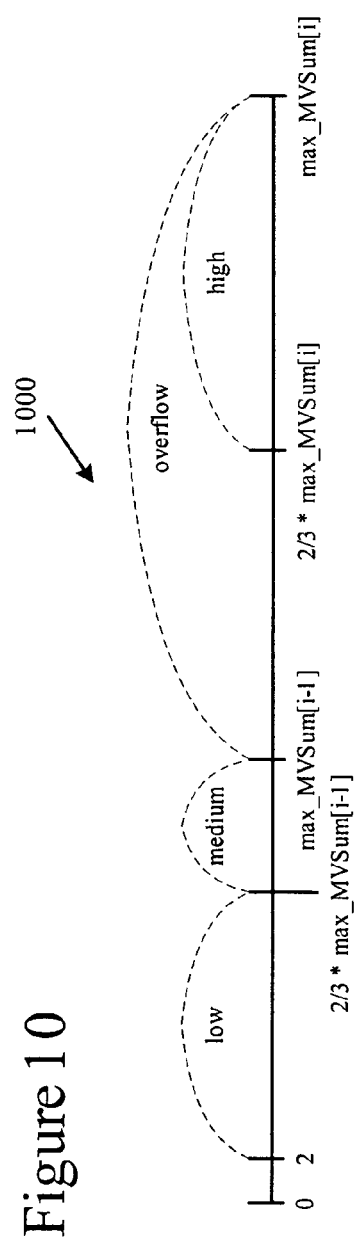
FIG. 8 is a table of values used in the example of FIGS. 7, 9 and 11.
FIG. 10 is a chart showing pre-defined motion intervals for the example histogram feature extraction routine of FIG. 9.

FIG. 6 shows a technique (600) for selecting a motion vector range and/or search range using motion vector distribution information. An encoder such as the one shown in FIG. 3 performs the technique (600) as part of the update stage (530) of the dynamic switching technique (500) of FIG. 5. Alternatively, the encoder performs the selection technique (600) at some other time, or another encoder or motion estimation tool performs the technique (600). FIGS. 7, 9, and 11 show pseudocode used in the technique (600) in an example implementation, and FIG. 8 shows a table of values used in the example implementation.

To start, the encoder calculates (610) a histogram for previous motion vectors. For example, the encoder calculates a histogram for some or all of the motion vectors of a preceding P-picture.

FIG. 7 is a pseudocode listing (700) illustrating an example routine for histogram calculation from the horizontal and vertical motion vector components of previously computed motion vectors. The routine CalculateMVHistogram accepts two arrays as input. The arrays MV_x and MV_y store signed horizontal and vertical motion vector component values, respectively, for the previously computed motion vectors. The arrays MV_x and MV_y store values on block-by-block basis, and the encoder may pre-process the values in the arrays. For example, if the arrays store component values for 8×8 blocks but a particular 16×16 macroblock has a single motion vector, the component values for the single motion vector are repeated for the four constituent 8×8 blocks of the macroblock. In general, previously computed motion vectors for different block sizes (e.g., 16×16, 8×8, 16×8, 8×16, 8×4, 4×8, or 4×4) and different kinds of predicted pictures (e.g., progressive frames, interlace fields, or interlace frames) are converted to a uniform representation (e.g., 8×8 non-interlaced blocks) for histogram calculation. For different block sizes, this can involve repeating motion vector component values from a block larger than the uniform representation size, or it can involve combining motion vector component values from adjacent blocks smaller than the uniform representation size. For interlaced content, this can involve adjusting for interlace timing. FIG. 7 shows MV_x and MV_y as one-dimensional arrays, but they can instead be organized as two-dimensional arrays, mirroring a block organization. The size of MV_x and MV_y depends on how many motion vectors are represented.

The output array MVHistogram stores the output histogram. In FIG. 7, MVHistogram tracks the previous motion vectors by sum of absolute values of horizontal and vertical motion vector components. Specifically, the histogram includes a counter for each possible sum of absolute values of motion vector components. For each of the motion vector ranges shown in Table 1, the table (800) of FIG. 8 indicates the maximum sum and hence the number of counters in MVHistogram for the motion vector range. In FIG. 8, MVRangeX indicates the maximum allowed absolute value of horizontal motion vector component for the range i, and MVRangeY indicates the maximum allowed absolute value of vertical motion vector component for the range i. Max_MvSum is the sum of MVRangeX and MVRangeY for the range i.

Returning to FIG. 7, MVHistogram is initialized to values of zero. On a block-by-block basis, the encoder iterates through the MV_x and MV_y arrays. If a block is intra coded, the encoder increments the counter for no motion (horizontal and vertical components equal to zero). Otherwise, the encoder determines the absolute values of the horizontal and vertical motion vector components for the block and increments the MVHistogram counter for the sum of the absolute values.

Alternatively, the encoder uses some other mechanism to calculate a histogram using previous motion vectors. For example, the encoder uses different data structures for motion vector components or the histogram, ignores intra-coded blocks, uses a metric other than sum of absolute values for the histogram, or uses different weights for horizontal and vertical components to give horizontal motion vector components more weight, or vice versa.

Returning to FIG. 6, the encoder extracts (620) one or more features of the histogram. In essence, the encoder summarizes the information in the histogram as one or more parameters used in later decision-making.

FIG. 9 is a pseudocode listing (900) illustrating an example routine for histogram feature extraction with a histogram produced according to the pseudocode (700) of FIG. 7. With ExtractHistogramFeature, the encoder counts motion vectors falling within different intervals of the histogram. ExtractHistogramFeature accepts as input the histogram and produces as output four motion interval count totals: low, medium, overflow, and high.

The following table shows four pre-determined motion intervals for any given MVRangeIndex of i as the motion vector range.

TABLE 2

Motion Intervals for IFI[istogram Feature Extraction

| Interval | | Definition |
|---|---|---|
| low motion | for i > 0, | [2, max_MVSum[i − 1] * 2/3). |
| | for i = 0, | undefined. |
| medium motion | for i > 0, | [max_MVSum[i − 1] * 2/3, max_MVSum[i − 1]). |
| | for i = 0, | undefined. |
| overflow | for i > 0, | [max_MVSum[i − 1], max_MVSum[i]]. |
| | for i = 0, | [2, max_MVSum[i]]. |
| high motion | for i >= 0, | [max_MVSum[i] * 2/3, max_MVSum[i]]. |

FIG. 10 charts the four motion intervals of Table 2 for i>0. For example, for i=2, the intervals are 2 to 511, 512 to 767, 768 to 2560, and 2048 to 2560, respectively. The first two motion intervals are undefined for i=0. If i=0, the overflow interval extends to 2.

For i>0, the overflow motion interval indicates that part of the motion vector range i that had motion that would not have been captured if the next smaller range had been used for the previous motion vectors. The overflow motion interval overlaps the high motion interval, which provides a simple way for the encoder to distinguish such overflow motion from high motion in the motion vector range.

In ExtractHistogramFeature, the encoder calculates the count of previous motion vectors whose absolute value sums fall into the four motion intervals. The encoder initializes counters for the four intervals as zero. If the motion vector range i for the previous motion vectors is greater than zero, the encoder loops through the histogram counters in the low, medium, and high intervals, summing the histogram counters in the respective intervals. The encoder loops through the histogram counters for the part of the overflow interval that does not overlap the high interval, then adds the high interval count total to the overflow interval count total. Not looping through the high interval twice saves a small amount of time in the histogram summing operations.

If the motion vector range i is zero, the encoder loops through the histogram counters in the high interval, loops through the histogram counters for the part of the extended overflow interval that does not overlap the high interval, then adds the high interval count total to the overflow interval count total.

Alternatively, the encoder uses some other mechanism to extract features from a histogram. For example, the encoder uses other and/or additional intervals of absolute value sums. Or, the encoder summarizes histogram information using other parameter values or statistics such as mean absolute value sum for an interval. Or, for different metrics in a histogram, the encoder uses different ranges, for example, ranges in multiple dimensions.

Returning to FIG. 6, the encoder next selects (630) an updated motion vector range and/or search range. For example, using the histogram feature(s), the encoder selects a new motion vector range for a current P-picture and any B-pictures between (in playback order) the previous and current P-pictures. The updated motion vector range can be the same or different than the previous motion vector range, and the updated search range can be the same or different than the previous search range.

FIG. 11 is a pseudocode listing (1100) illustrating an example routine for motion vector range selection using the histogram features extracted according to the pseudocode (900) of FIG. 9. In the routine DecideRange, the encoder adjusts the previous (and default current) motion vector range i by +1 or −1, or does not change i at all. DecideRange accepts as input the histogram features low, medium, overflow, and high and produces as output a new motion vector range. In general, given the numbers of motion vectors in the four above-defined intervals, the encoder determines the new motion vector range based on the following criteria:

1. The number of blocks with non-zero motion vectors should satisfy a first threshold in order for the motion vector range to be increased by 1. (In the example of FIGS. 9-11, motion vectors having an absolute value sum of 1 are treated like zero-value motion vectors.)

2. The number of motion vectors in the high motion interval should satisfy a second threshold in order for the motion vector range to be increased by 1.

3. The number of motion vectors in the overflow motion interval should satisfy a third threshold in order for the motion vector range to be decreased by 1.

4. The number of motion vectors in the medium motion interval should satisfy a fourth threshold in order for the motion vector range to be decreased by 1.

With reference to FIG. 11, the routine DecideRange implements these four criteria in conditional checks. First, the encoder computes the number of non-zero motion vectors, NonZeroMotion. For the four motion intervals low, medium, overflow, and high, this is the sum of the low, medium and overflow interval count totals. The encoder sets the updated motion vector range equal to the default current range, which will be the final range unless it is incremented or decremented.

The encoder increments the motion vector range i if (1) NonZeroMotion is greater than α* the number of blocks across which the previous motion vectors were collected, AND (2) the number of motion vectors in the high interval is greater than β*NonZeroMotion. In check (1), the number of blocks is the number of blocks, intra-coded or inter-coded, from which the previous motion vectors were collected. For example, if the previous motion vectors are the motion vectors of the previous P-picture, the number is the number of blocks in the previous P-picture, adjusted to the uniform block size of the motion vector representation. The motivation behind check (1) is to increase the motion vector range only when some threshold amount of overall motion activity is reached, and not just if there is high motion activity in a few blocks. The motivation behind check (2) is to increase the motion vector range only when some threshold amount of high motion activity is reached. The values of α and β depend on implementation.

The encoder decrements the motion vector range i if (3) the number of motion vectors in the overflow interval is less than γ*NonZeroMotion, AND (4) the number of motion vectors in the medium interval is less than β*NonZeroMotion. The motivation behind check (3) is to decrease the motion vector range only when some threshold amount of motion inactivity is reached in the overflow interval. The value of γ depends on implementation. The motivation behind check (4) is to further verify that the medium interval does not have much of the motion activity. The encoder can use different weights in checks (2) and (4).

In DecideRange, the encoder clips the new range to ensure that it is between 0 and 3, inclusive. Or, instead of clipping, the encoder can verify that i<3 in the increment conditions and verify that i>0 in the decrement conditions.

Example values of α, β and γ are α=0.1, β=0.1 and γ=0.02. Across various encoding scenarios in which motion vector range is updated per P-picture and the number of intervening B-pictures is two or less, these settings provide good performance. With these settings, the encoder is slightly more aggressive in increasing range size than decreasing range size, which tends to favor motion estimation quality at the expense of computational cost.

Alternatively, the encoder uses some other mechanism to select a motion vector range and/or search range from histogram features. For example, the encoder uses different thresholds and/or different selection conditions. Or, for different histogram features, the encoder uses different range selection logic. Or, the encoder selects a new search range using the histogram features, without regard to motion vector range per se.

4. Distortion Metric Selection in Motion Estimation

During block-based motion estimation, an encoder typically compares a current block of samples from a current picture with one or more candidate blocks of the same size in a reference picture. The encoder uses a distortion metric to evaluate the match between the current block and a candidate block. SAD, SAHD, and Lagrangian rate-distortion cost are common distortion metrics. Other distortion metrics include SSE, MSE, and mean variance.

When deciding which distortion metric to use in an encoder, one goal is to accurately account for the overall rate-distortion cost incurred for a particular motion estimation choice. Accurate estimation of rate-distortion cost improves rate-distortion performance, as good motion estimation choices are identified. It can also improve encoder performance when the good motion estimation choices are identified early in motion estimation.

Another goal is for the distortion metric to be low complexity. Motion estimation consumes a large proportion of encoding time, and incremental changes in the computational complexity of a distortion metric can dramatically affect encoder performance in the aggregate. The goals of low complexity and high accuracy are frequently in tension. Compared to low-complexity distortion metrics such as SAD, high-complexity distortion metrics such as SAHD more accurately account for overall rate-distortion costs much of the time.

This section describes techniques that enable an encoder or other tool to dynamically switch between different distortion metrics when performing motion estimation. The available distortion metrics, selection criteria and thresholds, timing of distortion metric switching, and other encoding details depend on implementation. In some implementations, an encoder encoding video for the Windows Media Video main or advanced profile or a VC-1 profile dynamically chooses distortion metrics to improve rate-distortion performance while also reducing overall computational complexity. Alternatively, an encoder encoding video for another format or profile performs dynamic selection of distortion metrics.

A. Theory and Explanation

Distortion metric switching allows an encoder to improve rate-distortion performance by selectively using different distortion metrics to more accurately account for rate-distortion costs during motion estimation. At the same time, distortion metric switching allows an encoder to reduce the overall computational complexity of motion estimation by using a simpler distortion metric if there no penalty for doing so (or just a small, acceptable penalty). For example, an encoder switches between SAD and SAHD.

SAHD typically approximates overall rate-distortion cost more accurately than SAD when there are non-zero transform coefficients following quantization. In such cases, SAHD accounts for the energy-compaction effects of a frequency transform, which SAD ignores. As such, the encoder uses SAHD when energy-compaction from a frequency transform is expected to impact the distortion costs of residuals.

On the other hand, SAHD is more computationally complex than SAD due to the Hadamard transform in SAHD. And, in a few circumstances, SAD accounts for rate-distortion performance more accurately than SAHD. (SAD better approximates rate-distortion cost when there are no non-zero quantized transform coefficients, since the energy-compaction effects of the frequency transform are rendered moot.) Therefore, the encoder uses SAD when residuals are expected to lack energy in the transform-domain following quantization. Selectively using SAD can greatly reduce the overall computational complexity of motion estimation.

For example, an encoder computes a residual between a current block and an initial candidate block of a reference picture. The initial candidate block can be the candidate block at the location of a predicted motion vector in the reference picture. One common mechanism for computing a predicted motion vector uses the component-wise medians of motion vectors of the left, top, and top-right neighbors of the current block, but another mechanism can instead be used. The encoder adds the absolute values of the residual values and compares this $SAD_{initial}$ to a threshold. The threshold is set to a value below which a residual necessarily yields only zero-value quantized transform coefficients. If $SAD_{initial}$ is less than the threshold, the encoder uses SAD in motion estimation for the current block. Otherwise, the encoder uses SAHD in the motion estimation for the current block.

Selectively switching between SAD and SAHD provides rate-distortion performance superior to using only SAD or only SAHD during motion estimation. In some cases, SAHD provides better rate-distortion performance than SAD. In other cases, SAD provides better rate-distortion performance than SAHD.

In addition, the computational complexity of motion estimation with SAD-SAHD switching is less than motion estimation that always uses SAHD. The encoder uses low-complexity SAD when SAD provides better rate-distortion performance or otherwise suffices. In particular, in low bit rate encoding scenarios, many residuals yield only zero-value coefficients due to coarse quantization. As a result, the computational complexity of motion estimation can be significantly reduced by selectively using SAD instead of SAHD. Similarly, in low-motion video, many residuals yield only zero-value coefficients due to effective motion estimation, and the computational complexity of motion estimation can be significantly reduced by selectively using SAD instead of SAHD.

B. Example Threshold Functions

For a given quantization parameter QP and quantizer, certain transform coefficient values are quantized to zero during encoding. For the QP and quantizer, there is a highest-amplitude transform coefficient value that will be quantized to zero. A transform coefficient having the next higher amplitude will be quantized to the lowest, non-zero quantized value.

Moreover, for a given frequency transform, the matrix values used in the transform are defined. Some of these values are positive and others are negative. The matrix value having the highest amplitude has the greatest potential for causing expansion in values in the transform.

When a residual having a given value of SAD is transformed, one or more of the transform coefficients will have a higher amplitude than the others. Some patterns of residual values result in transform coefficients with a large highest-amplitude value. Other patterns of residual values (for residuals with the same given SAD) result in transform coefficients with a small highest-amplitude value. In particular, when non-zero residual values are spread throughout a residual, the highest amplitude among the resulting transform coefficients is usually small. On the other hand, if there is a single non-zero residual value in a certain position in the residual, the highest amplitude among the resulting transform coefficients can be much larger, due to the effect of the highest-amplitude matrix value on the isolated residual value.

Considering these factors, a threshold can be set such that any residual block having a SAD less than the threshold will have only zero-value quantized transform coefficients. The threshold depends on the current quantization parameter QP and quantizer. The threshold also depends on the frequency transform in use, since the highest-amplitude matrix value is different in different transforms.

In some implementations, the threshold is a function $f(QP)$ of a current quantization parameter QP, which indicates a current quantization step size. The function $f(QP)$ depends on the quantizer dead zone, which is the range of values around zero that are quantized to zero. The function $f(QP)$ is set so that if $SAD_{initial} < f(QP)$, the residual from which $SAD_{initial}$ was computed has only zero-value quantized transform coefficients. The function $f(QP)$ depends on the quantization dead zone, quantization and reconstruction rules, and frequency transform used during encoding, and is different for VC-1, H.264, etc. The function $f(QP)$ can be computed off-line for a given frequency transform and quantization scheme, stored in an array or other data structure, then used during encoding.

Depending on implementation, the quantization parameter QP can be set for a picture, slice, macroblock, block, or other portion of a video picture or sequence. For example, an encoder sets a quantization step size for a picture, but potentially modifies it at the slice, macroblock, and/or block level. The quantization parameter QP can indicate integer quantization step size increments or fractional (e.g., ½-step) quantization step size increments.

The quantizer dead zone relates to the quantization parameter QP. When QP is small the dead zone is effectively smaller, and when QP is large the dead zone is effectively larger. An encoder can switch between quantizers having different dead zone ratios, for example, a "uniform" quantizer having a dead zone with the same width as the current quantization step range and a "non-uniform" quantizer having a dead zone that is about double the width of the current quantization step range.

In practice, an encoder often uses quantization that is a bit more aggressive than the corresponding reconstruction rules. For example, compared to a mid-point between two possible values after reconstruction, the encoder applies a quantization threshold that is slightly further away from zero. As a result, values around the mid-point are quantized to the lower of two quantized values, rather than being mapped to the closer, higher quantized value. In particular, the encoder often increases the width of the dead zone slightly so as to have more values quantized to zero.

1. Example Quantizer Dead Zones

In certain profiles of VC-1, a quantization parameter MQUANT has a value between 1 and 31, indicating quantization step size in integer increments. MQUANT is based upon a picture-level quantization parameter PQUANT, but can be modified (or even replaced) by subsequent quantization parameters for specific macroblocks or picture areas. An extra-bit of information HALFQP can indicate half-step increments.

For a "uniform" quantizer, the reconstruction rule for non-zero AC coefficients is:

$$dequant\_ACcoeff = ACCoeffQ * double\_quant,$$

where ACCoeffQ is the quantized AC coefficient and dequant_ACcoeff is the inverse quantized AC coefficient. If the block is coded with PQUANT:

$$double\_quant = 2 * MQUANT + HALFQP.$$

If the block is coded with the other quantization syntax elements:

$$double\_quant = 2 * MQUANT.$$

For a "non-uniform" quantizer, the reconstruction rule for non-zero AC coefficients is:

$$dequant\_ACcoeff = ACCoeffQ * double\_quant + sign(ACCoeffQ) * Qscale,$$

where Q_scale=MQUANT.

Applying these VC-1 reconstruction rules to determine the mid-points between possible de-quantized values after reconstruction, and setting a dead zone threshold DZ at the same offset less than the first non-zero de-quantized value, the following table shows examples of dead zone thresholds DZ for different values of MQUANT and HALFQP with a uniform quantizer and a non-uniform quantizer in VC-1. The dead zone threshold DZ indicates an absolute value below which values are quantized to zero.

TABLE 3

Example Dead Zone Thresholds for a VC-1 Encoder

| MQUANT | HALFQP | DZ(QP) for uniform quantizer | DZ(QP) for non-uniform quantizer |
|---|---|---|---|
| 1 | 0 | 1 | 2 |
| 1 | 1 | 1.5 | 2.5 |

TABLE 3-continued

Example Dead Zone Thresholds for a VC-1 Encoder

| MQUANT | HALFQP | DZ(QP) for uniform quantizer | DZ(QP) for non-uniform quantizer |
|---|---|---|---|
| 2 | 0 | 2 | 4 |
| 2 | 1 | 2.5 | 4.5 |
| 3 | 0 | 3 | 6 |
| 3 | 1 | 3.5 | 6.5 |
| 4 | 0 | 4 | 8 |
| 4 | 1 | 4.5 | 8.5 |
| 5 | 0 | 5 | 10 |
| 5 | 1 | 5.5 | 10.5 |
| 6 | 0 | 6 | 12 |
| 6 | 1 | 6.5 | 12.5 |
| 7 | 0 | 7 | 14 |
| 7 | 1 | 7.5 | 14.5 |
| 8 | 0 | 8 | 16 |
| 8 | 1 | 8.5 | n/a |
| 9 | n/a | 9 | 18 |
| 10 | n/a | 10 | 20 |
| ... | ... | ... | ... |
| 29 | n/a | 29 | 58 |
| 30 | n/a | 30 | 60 |
| 31 | n/a | 31 | 62 |

In practice, a VC-1 encoder can use different dead zone thresholds, for example, dead zone thresholds that more aggressively quantize values to zero. In that case, the dead zone thresholds would be slightly higher than the ones shown in Table 3. Also, DC coefficients may be quantized less aggressively than AC coefficients, especially at higher quantization step sizes. With this factor in mind, the VC-1 encoder may slightly reduce certain dead zone thresholds, especially for higher values of QP.

According to the H.263 standard, a picture-layer value QUANT has a value between 1 and 31 and indicates half-step quantization step size increments. The value of QUANT can be changed by later syntax elements such as DQUANT. The reconstruction rule for non-zero AC coefficients is:

|REC|=QUANT·(2·|LEVEL|+1), if QUANT is odd, and

|REC|=QUANT·(2·|LEVEL|+1)−1, if QUANT is even, where REC is the reconstructed AC coefficient and LEVEL is the quantized AC coefficient. After calculation of |REC|, the sign is incorporated:

REC=sign(LEVEL)·|REC|.

Consistent with these H.263 reconstruction rules, the following table shows examples of dead zone thresholds DZ for different values of QUANT in H.263.

TABLE 4

Example Dead Zone Thresholds for a H.263 Encoder

| QUANT | DZ(QUANT) |
|---|---|
| 1 | 2 |
| 2 | 3 |
| 3 | 6 |
| 4 | 7 |
| 5 | 10 |
| 6 | 11 |
| ... | ... |
| 29 | 58 |
| 30 | 59 |
| 31 | 62 |

In practice, a H.263 encoder can use different dead zone thresholds, for example, dead zone thresholds that more aggressively quantize values to zero.

Other encoders similarly have dead zone thresholds consistent with the quantizers, quantization and reconstruction rules, and allowed quantization step sizes in those encoders. Typically, the dead zone threshold monotonically increases as QP increases, but the steps at which the dead zone threshold increases and the ratio of the dead zone threshold to QP vary depending on how quantization is implemented.

2. Example Transform Scaling Factors

The dead zone threshold applies to transform coefficients, whereas $SAD_{initial}$ is computed from sample-domain values. As such a scaling factor k is incorporated into the threshold:

$SAD_{initial} < DZ/k,$ $f(QP)=DZ/k$. The scaling factor k depends on the greatest possible expansion for a given SAD value. Consider the following one-dimensional 8-point transform $T_8$ and one-dimensional 4-point transform $T_4$ from VC-1.

$$T_8 = \begin{bmatrix} 12 & 12 & 12 & 12 & 12 & 12 & 12 & 12 \\ 16 & 15 & 9 & 4 & -4 & -9 & -15 & -16 \\ 16 & 6 & -6 & -16 & -16 & -6 & 6 & 16 \\ 15 & -4 & -16 & -9 & 9 & 16 & 4 & -15 \\ 12 & -12 & -12 & 12 & 12 & -12 & -12 & 12 \\ 9 & -16 & 4 & 15 & -15 & -4 & 16 & -9 \\ 6 & -16 & 16 & -6 & -6 & 16 & -16 & 6 \\ 4 & -9 & 15 & -16 & 16 & -15 & 9 & -4 \end{bmatrix}$$

$$T_4 = \begin{bmatrix} 17 & 17 & 17 & 17 \\ 22 & 10 & -10 & -22 \\ 17 & -17 & -17 & 17 \\ 10 & -22 & 22 & -10 \end{bmatrix}$$

A VC-1 encoder can perform forward 4×4, 4×8, 8×4, and 8×8 transforms on a residual data block $D_{i \times j}$ (having i rows and j columns) as follows:

$\hat{D}_{4 \times 4} = (T_4 \cdot D_{4 \times 4} \cdot T_4') \circ N_{4 \times 4}$ for a 4×4 transform,
$\hat{D}_{8 \times 4} = (T_8 \cdot D_{8 \times 4} \cdot T_4') \circ N_{8 \times 4}$ for a 8×4 transform,
$\hat{D}_{4 \times 8} (T_4 \cdot D_{4 \times 8} \cdot T_8') \circ N_{4 \times 8}$ for a 4×8 transform, and
$\hat{D}_{8 \times 8} = (T_8 \cdot D_{8 \times 8} \cdot T_8') \circ N_{8 \times 8}$ for a 8×8 transform, where · indicates a matrix multiplication, $\circ N_{i \times j}$ indicates a component-wise multiplication by a normalization factor, T' indicates the inverse of the matrix T, and $\hat{D}_{i \times j}$ represents the transform coefficient block. The values of the normalization matrix $N_{i \times j}$ are given by:

$N_{i \times j} = c_i' \cdot c_j,$ where:

$c_4 = \left( \dfrac{8}{289} \quad \dfrac{8}{292} \quad \dfrac{8}{289} \quad \dfrac{8}{292} \right)$, and $c_8 = \left( \dfrac{8}{288} \quad \dfrac{8}{289} \quad \dfrac{8}{292} \quad \dfrac{8}{289} \quad \dfrac{8}{288} \quad \dfrac{8}{289} \quad \dfrac{8}{292} \quad \dfrac{8}{289} \right).$ The different normalization factors relate to different amounts of expansion caused by transform matrix values in the forward transform. They also set up simple normalization by right shifting in the inverse transform.

When the one-dimensional 8-point VC-1 transform is applied to the columns of a residual and then to the rows of the result, the first matrix value of the second transform row (i.e., 16) is one that has the greatest potential for causing expansion. Considering normalization, it causes scaling by a factor of $16_2 * (8/289)^2 = 0.198$, or approximately 16/81.

Suppose $SAD_{initial}$ is 25 for a given initial candidate block. The following two blocks show possible residuals for which the $SAD_{initial}$ is 25.

$$\begin{bmatrix} 25 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

$$\begin{bmatrix} 1 & 3 & 1 & 0 & 0 & 0 & 0 & 0 \\ 1 & 3 & 1 & 0 & 0 & 0 & 0 & 0 \\ 1 & 3 & 1 & 0 & 0 & 0 & 0 & 0 \\ 1 & 3 & 1 & 0 & 0 & 0 & 0 & 0 \\ 0 & 3 & 0 & 0 & 0 & 0 & 0 & 0 \\ 0 & 2 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

In the first block, the energy of $SAD_{initial}=25$ is isolated in a single residual value that is exposed to the high-amplitude transform matrix value in horizontal and vertical transforms. When the 8-point transform is applied vertically and horizontally, a coefficient value of $25 \times 0.198 \approx 5$ appears in the second position of the second row of $\hat{D}$. In contrast, with the second block, the energy of $SAD_{initial}=25$ is spread across 14 residual values. As a result, when the 8-point transform is applied vertically and horizontally, no coefficient value is as high as 5. The impact of lower amplitude matrix values and negative matrix values is lower values of transform coefficients. Thus, if the question is whether all transform coefficients will be quantized to zero, a pattern where the energy of a given $SAD_{initial}$ is isolated in a single residual value that is exposed to the highest-amplitude transform matrix coefficient provides a worst case. This pattern results in the highest individual transform coefficient value from a residual having that value of $SAD_{initial}$.

For this reason, for the threshold function $f(QP)$, the scaling factor k depends on the highest amplitude transform matrix value for the frequency transform. Typically, this is the first coefficient of the second row of a one-dimensional transform, which corresponds to the first coefficient of the lowest AC basis function. For a 4×8 or 8×4 transform in VC-1, the scaling factor k is $16*(8/289)*22*(8/292)=0.267$. For a 4×4 transform, the scaling factor k is $22^2*(8/292)^2.=0.363$.

If the dead zone interval for a given QP and quantizer is represented as DZ(QP), then the threshold function $f(QP)$ for a forward transform in VC-1 is DZ(QP)/k, where k depends on the transform size.

In H.263, the highest amplitude transform matrix value for a one-dimensional DCT is 0.49, after normalization. Again, this is the first coefficient of the lowest AC basis function. For a two-dimensional DCT, the scaling factor k is $(0.49)^2=0.24$. The threshold function $f(QP)$ for a forward transform in H.263 is DZ(QP)/0.24, or roughly 4*DZ(QP).

3. Alternatives

An alternative, brute-force approach to determining the threshold $f(QP)$ for a given quantizer and frequency transform is as follows. For a quantization parameter QP possible in the function $f(QP)$, a value m of SAD is evaluated. In particular, a residual having a single non-zero value with amplitude m is frequency transformed. (The value m is in the top, left position of the residual, or in some other position shown in testing to produce the highest single transform coefficient value.) The transform coefficients are quantized with QP. If there are any non-zero quantized transform coefficients, the next lower value of m is evaluated. If all quantized transform coefficients have the value of zero, the next higher value of m is evaluated. This continues until the highest value of m yielding all zero-value quantized transform coefficients is found for QP. A different value of QP is then evaluated. When the possible values of QP in $f(QP)$ have been evaluated, the threshold function $f(QP)$ for a different frequency transform or quantizer can be determined.

The preceding uses and definitions of the threshold function $f(QP)$ are conservative in several respects. Suppose the threshold is checked for an initial candidate block (at the location of a predicted motion vector or zero-value motion vector). The residual for the initial candidate block is expected to be larger than the residual for the final candidate block. Checking the threshold for only the initial candidate block, however, fails to account for convergence towards a better match.

Moreover, under the conservative definitions of $f(QP)$, many residual blocks having $SAD_{initial}$ greater than the threshold $f(QP)$ still yield only zero-value quantized transform coefficients. This often happens, for example, when non-zero residual values are spread around the residual block.

Alternatively, an encoder uses a threshold function that is not quite as conservative, correctly characterizing more "all zero-values" cases but potentially missing a few "non-zero-value" cases. For example, in a less conservative threshold test, the encoder considers the mean value or DC component of the residual block. If the DC component/mean value of the residual is 0 or close to zero (e.g., due to negative residual values), the performance of SAD may suffice, so the threshold is satisfied.

Or, the encoder considers the number of residual values contributing to $SAD_{initial}$ in a less conservative threshold test. The threshold is satisfied if there are at least x non-zero values (where x is 5, 6, etc.).

Or, the encoder considers whether the absolute value of any non-zero residual value is greater than $SAD_{initial}/2$. If not, the encoder deems the threshold satisfied.

C. Dynamically Switching Distortion Metrics

Figure 12:
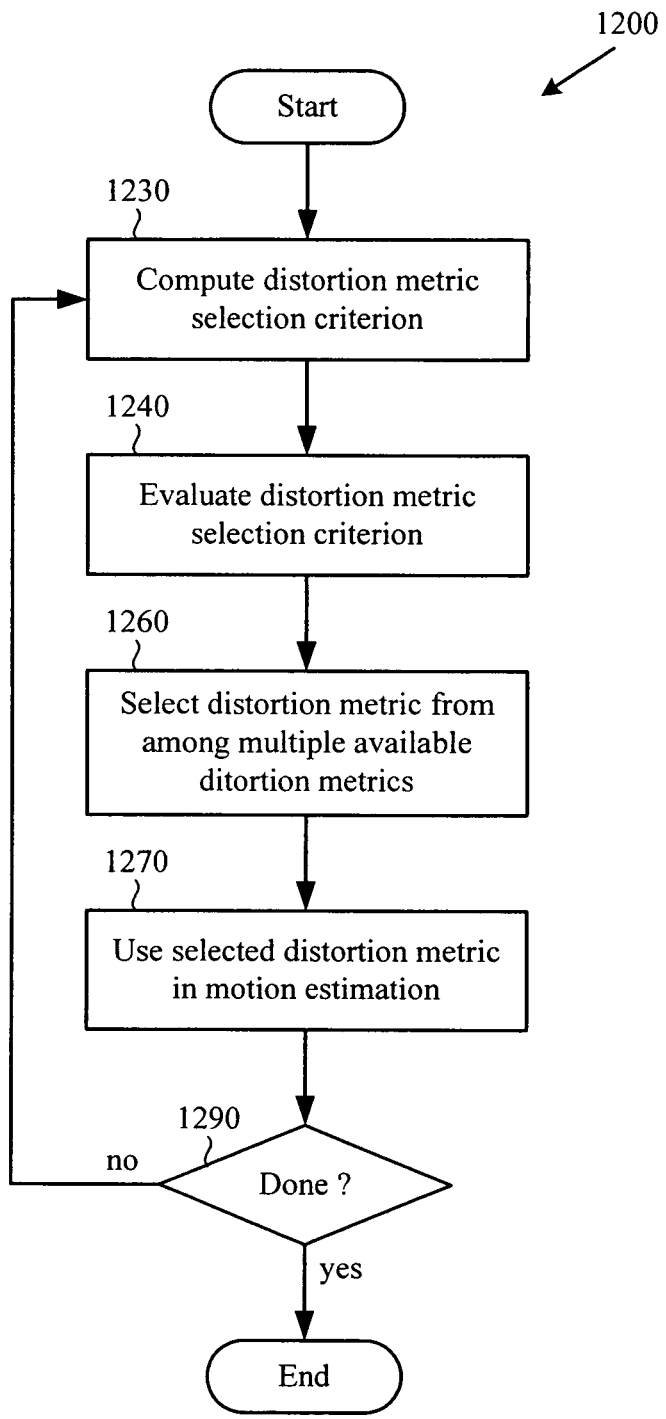
FIG. 12 is a flowchart of a generalized technique for selecting a distortion metric from among multiple available distortion metrics.

FIG. 12 shows a generalized technique (1200) for dynamically switching distortion metrics during motion estimation. An encoder such as the one described above with reference to FIG. 3 performs the technique (1200). Alternatively, another tool performs the technique (1200).

To start, the encoder computes (1230) a distortion metric selection criterion. For example, the encoder computes the SAD for a residual between a current block and an initial candidate block at the start of a search pattern. The initial candidate block can be the block at a the zero-value motion vector, the block at a predicted motion vector location, or some other initial candidate block. Alternatively, the distortion metric selection criterion incorporates other and/or additional factors, such as mean value or DC component of the residual, the count of non-zero residual values and/or whether any non-zero residual value surpasses a certain fraction (e.g., ½) of the SAD for the residual.

The encoder then evaluates (1240) the distortion metric selection criterion. For example, the encoder compares the criterion to a threshold (or thresholds if multiple factors are incorporated into the selection criterion). Or, the encoder evaluates the criterion in some other way, for example, using a decision tree that leads to different decisions depending on the factors of the selection criterion.

The encoder selects (1260) a distortion metric from among multiple available distortion metrics. For example, the encoder selects between SAD and SAHD. Alternatively, the encoder selects between other and/or additional distortion metrics, which can include one or more rate-distortion cost metrics, SSE, MSE, mean variance, and a SATD other than SAHD.

The encoder then uses (1270) the selected distortion metric in motion estimation. Specifically, the encoder uses the selected distortion metric to evaluate the fitness of one or more motion estimation choices. The motion vector range(s), search range(s), search pattern(s), exit condition(s), sub-pixel interpolation and other details of the motion estimation vary depending on implementation. For example, the encoder uses a full search, partial search, or other search range in the motion estimation, uses a block search pattern (such as 3×3 or 5×5), spiral search pattern, or other search pattern, and starts around a predicted motion vector location or a zero-value motion vector location. The motion estimation can be hierarchical, for example, having 4:1 sub-sampled, integer-pixel, and ¼-pixel stages, or some other configuration of stages.

At some point during or after the motion estimation (1270), the encoder determines (1290) whether or not to continue. For example, an encoder computes (1230) the selection criterion for a current block or macroblock as part of an initial check in motion estimation for the current block/macroblock. This allows the encoder to selectively reduce computational complexity from the start of motion estimation. The encoder uses the selected distortion metric until motion estimation is completed for the current block/macroblock. The encoder then determines (1290) whether or not to continue with the next block or macroblock and, if so, computes (1230) the selection criterion for the next block/macroblock.

Or, the encoder computes (1230) the selection criterion for a current block or macroblock as part of an initial check, selects (1260) and uses (1270) a distortion metric in motion estimation, but subsequently determines (1290) whether or not to continue with the same distortion metric for the current block/macroblock. If the encoder starts with a first metric such as SAHD, but residual values approach a point where a second metric such as SAD would be preferable, the encoder switches to the second metric for the current block/macroblock.

For hierarchical motion estimation, the encoder can compute (1230) the selection criterion as an initial and/or intermediate check in a stage. For example, for a first, lowest resolution stage, the encoder computes (1230) the selection criterion and selects (1260) and uses (1270) a distortion metric in motion estimation for the stage. The encoder then continues with a second, higher resolution stage, computing (1230) the selection criterion and selecting (1260) and using (1270) a distortion metric in motion estimation for the stage. The distortion metrics available at the respective stages can be the same or different from stage to stage. An encoder can bypass the distortion metric selection at higher resolution stages (using only, e.g., a rate-distortion cost metric).

Figure 13:
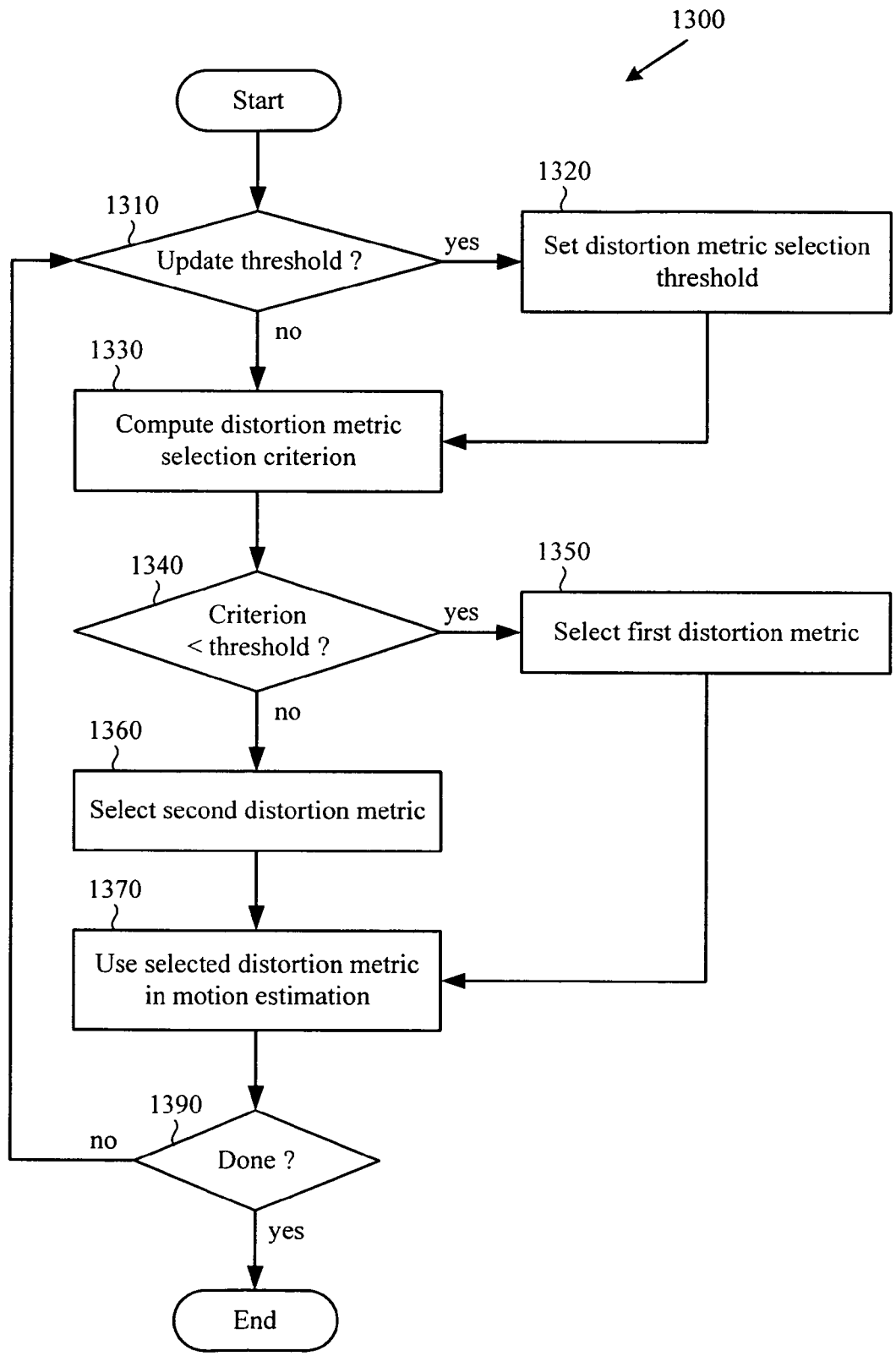
FIG. 13 is a flowchart of a technique for selecting distortion metrics depending on distortion metric selection criteria and selection thresholds.

FIG. 13 shows a technique (1300) for selecting distortion metrics using distortion metric selection criteria and selection thresholds. An encoder such as the one described above with reference to FIG. 3 performs the technique (1300). Alternatively, another tool performs the technique (1300).

To start, the encoder determines (1310) whether or not to update the distortion metric selection threshold. For example, if the threshold depends on a current quantization step size, quantization dead zone interval, and frequency transform, the encoder checks whether any of these has changed. Or, if the threshold depends only on a current quantization step size, the encoder checks whether the quantization step size has changed.

To update the threshold, the encoder sets (1320) the distortion metric selection threshold. For example, using a data structure that relates threshold values to quantization parameter values for a given quantizer and frequency transform, the encoder sets the threshold given the current quantization parameter. The data structure can be an array or other data structure. The threshold values can be from a threshold function $f(QP)$ as described above or from another threshold function.

The encoder also computes (1330) a distortion metric selection criterion. For example, the encoder computes $SAD_{initial}$ for a residual between a current block and an initial candidate block. In conjunction with the threshold, $SAD_{initial}$ gives a simple, low-complexity indication of whether the residual will have only zero-value quantized transform coefficients. Or, the encoder uses some other selection criterion such as one described with reference to FIG. 12.

The encoder then compares (1340) the criterion to the threshold. For example, the encoder checks whether $SAD_{initial}$ is less than a threshold $f(QP)$. For selection criteria incorporating factors such as mean residual value, DC component of the residual, count of non-zero residual values, and/or fraction of $SAD_{initial}$, the encoder compares the factors to corresponding parts of the threshold.

The encoder then selects (1350) the first distortion metric or the selects (1360) the second distortion metric. For example, after comparing $SAD_{initial}$ to a conservative threshold function $f(QP)$, if $SAD_{initial} < f(QP)$, the encoder selects SAD since the quantized transform coefficients for the residual will have quantized values of zero. Otherwise, the encoder selects SAHD since one or more of the quantized transform coefficients for the residual may have non-zero quantized values. Alternatively, the encoder selects between other and/or additional distortion metrics.

The encoder uses (1370) the selected distortion metric to evaluate the fitness of one or more motion estimation choices. The details of the motion estimation vary depending on implementation, as described with reference to FIG. 12.

At some point during or after the motion estimation (1370), the encoder determines (1390) whether or not to continue. For example, the encoder computes (1330) selection criterion for each new block or macroblock in a picture as part of an initial check in motion estimation for the block/macroblock, updating the selection threshold as necessary, and determines (1390) to continue as long as there is a new block/macroblock in the picture. Or, the encoder computes (1330) the distortion metric selection criterion for a current block or macroblock as part of an initial check and determines (1390) during motion estimation for the current block/macroblock whether to selectively update the selection criterion and/or threshold.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method comprising, during encoding:
performing first motion estimation constrained by a first search range for a first predicted picture, resulting in plural motion vectors for the first predicted picture;
signaling, in a bit stream, a first motion vector range corresponding to the first search range, wherein the first motion vector range indicates motion vector sizes permitted, according to bit stream syntax of the bit stream, in the first motion vector range;
outputting, in the bit stream, results of the first motion estimation;
computing motion vector distribution information for the plural motion vectors for the first predicted picture, wherein the motion vector distribution information is organized as plural intervals of a histogram calculated based at least in part on the first motion vector range signaled in the bit stream;
based at least in part upon the motion vector distribution information for the plural motion vectors for the first predicted picture, selecting a second search range for a second predicted picture, the selecting the second search range comprising comparing a threshold to a count of motion vectors within at least one interval of the plural intervals of the histogram;
performing second motion estimation constrained by the second search range for the second predicted picture that is different than the first predicted picture;
signaling, in the bit stream, a second motion vector range corresponding to the second search range, wherein the second motion vector range indicates motion vector sizes permitted, according to the bit stream syntax of the bit stream, in the second motion vector range; and
outputting, in the bit stream, results of the second motion estimation;
whereby the signaling of the first motion vector range and the second motion vector range improves efficiency of entropy encoding of motion vector information from the first motion estimation and the second motion estimation.

2. The method of claim 1 wherein:
at least two of the plural intervals overlap; and
the second motion vector range is selected based at least in part on counts of the plural motion vectors within the plural intervals, respectively.

3. The method of claim 2 wherein the computing comprises:
tracking each of the plural motion vectors in the histogram; and
using the histogram, counting how many of the plural motion vectors fall within each of the plural intervals.

4. The method of claim 1 wherein the first motion vector range is the same as the second motion vector range.

5. The method of claim 1 wherein the selecting the second search range includes selecting the second motion vector range, and wherein the selection of the second motion vector range in effect determines the second search range.

6. The method of claim 1 wherein the selecting the second search range comprises picking between plural available search ranges of incrementally increasing sizes, and wherein the second search range is constrained to be one size larger, one size smaller, or the same size as the first search range.

7. The method of claim 1 wherein the second motion estimation is further performed for one or more additional predicted pictures between the first and second predicted pictures in playback order.

8. The method of claim 1 wherein the histogram includes counters for sums of absolute values of horizontal and vertical components of respective of the plural motion vectors.

9. The method of claim 1 wherein the threshold is a first threshold and the selecting the second search range further comprises comparing a second threshold to at least a count of a number of blocks in the first predicted picture that have non-zero motion vectors.

10. A method comprising, during encoding:
performing first motion estimation constrained by a first motion vector range and a first search range for a first predicted picture, resulting in plural motion vectors for the first predicted picture;
signaling the first motion vector range in a bit stream, wherein the first motion vector range indicates a first range of motion vector sizes according to syntax of the bit stream;
computing motion vector distribution information for the plural motion vectors for the first predicted picture, the motion vector distribution information being organized as plural intervals of a histogram calculated based at least in part on the first motion vector range signaled in the bit stream;
signaling results of the first motion estimation in the bit stream;
based at least in part upon the motion vector distribution information for the plural motion vectors for the first predicted picture, selecting a second motion vector range for a second predicted picture, the selecting the second motion vector range comprising comparing a threshold to a count of motion vectors within at least one interval of the plural intervals of the histogram;
performing second motion estimation constrained by the second motion vector range and a second search range for the second predicted picture that is different than the first predicted picture;
signaling the second motion vector range in the bit stream, wherein the second motion vector range indicates a second range of motion vector sizes according to the syntax of the bit stream; and
signaling results of the second motion estimation in the bit stream.

11. The method of claim 10 wherein at least two of the plural intervals overlap.

12. The method of claim 10 wherein the computing comprises:
tracking each of the plural motion vectors in the histogram; and
counting how many of the plural motion vectors fall within each of the plural intervals of the histogram.

13. The method of claim 10 further comprising:
using the first motion vector range in entropy encoding of motion vector information from the first motion estimation; and
using the second motion vector range in entropy encoding of motion vector information from the second motion estimation.

14. The method of claim 10 wherein the first motion vector range is the same as the second motion vector range, and wherein the first search range is the same or different than the second search range.

15. The method of claim 10 wherein the histogram includes counters for sums of absolute values of horizontal and vertical components of respective of the plural motion vectors.

16. The method of claim 10 wherein the threshold is a first threshold and the selecting the second motion vector range further comprises comparing a second threshold to at least a count of a number of blocks in the first predicted picture that have non-zero motion vectors.

17. An encoder comprising:
- a motion estimator for performing motion estimation;
- a frequency transformer for transforming prediction residuals into transform coefficients;
- a quantizer for quantizing the transform coefficients;
- a motion estimation controller for selecting motion vector ranges that constrain the motion estimation by limiting searches within selected search ranges to areas of the selected search ranges that can produce motion vectors within the selected motion vector ranges, wherein the selecting for a current picture is based at least in part upon motion vector distribution information for plural previous motion vectors of a previous picture organized as plural intervals of a histogram calculated based at least in part on a motion vector range for the previous picture and based at least in part upon counts of the plural previous motion vectors within the plural intervals of the histogram, respectively, and wherein at least two of the plural intervals of the histogram overlap;
- wherein the histogram includes counters for possible sums of absolute values of horizontal and vertical components of respective of the plural previous motion vectors;
- wherein the selecting for the current picture selects a motion vector range that is increased or decreased from the motion vector range from the previous picture;
- wherein the selecting for the current picture is further based in part on:
  - comparing a first threshold to a first count of the counts of the plural previous motion vectors within the plural intervals of the histogram to determine whether the first count is greater than the first threshold; and
  - comparing a second threshold to at least a count of a number of blocks in the previous picture that have non-zero motion vectors to determine whether the number of blocks in the previous picture that have non-zero motion vectors is greater than the second threshold; and
- an entropy encoder for entropy encoding motion vector information and the quantized transform coefficients, wherein a picture layer of a bit stream syntax includes signaled motion vector range information indicating a range, according to the bit stream syntax, of permitted sizes of motion vectors that constrain the motion estimation, and wherein the entropy encoder adapts the number of bits used to signal escape-coded motion vector information based on the motion vector range information signaled in the picture layer of the bit stream syntax.

18. The encoder of claim 17 wherein the selecting the search ranges includes selecting the motion vector ranges, and wherein the selection of the motion vector ranges in effect determines the search ranges.

* * * * *

UNITED STATES PATENT AND TRADEMARK OFFICE
CERTIFICATE OF CORRECTION

| | |
|---|---|
| PATENT NO. | : 8,494,052 B2 |
| APPLICATION NO. | : 11/400051 |
| DATED | : July 23, 2013 |
| INVENTOR(S) | : Chang et al. |

It is certified that error appears in the above-identified patent and that said Letters Patent is hereby corrected as shown below:

In the Specification

Column 6, line 56, delete "a image" and insert -- an image --, therefor.

Signed and Sealed this
Tenth Day of February, 2015

Michelle K. Lee
*Deputy Director of the United States Patent and Trademark Office*